US008774762B2

(12) United States Patent
Poltorak

(10) Patent No.: US 8,774,762 B2
(45) Date of Patent: Jul. 8, 2014

(54) MULTI-TIER SERVICE AND SECURE WIRELESS COMMUNICATIONS NETWORKS

(76) Inventor: Alexander Poltorak, Monsey, NY (US)

( * ) Notice: Subject to any disclaimer, the term of this patent is extended or adjusted under 35 U.S.C. 154(b) by 0 days.

(21) Appl. No.: 13/492,379

(22) Filed: Jun. 8, 2012

(65) Prior Publication Data
US 2012/0252407 A1 Oct. 4, 2012

Related U.S. Application Data

(63) Continuation of application No. 12/811,740, filed as application No. PCT/US2009/002674 on Apr. 29, 2009, now Pat. No. 8,224,289.

(60) Provisional application No. 61/125,971, filed on Apr. 30, 2008, provisional application No. 61/166,344, filed on Apr. 3, 2009, provisional application No. 61/167,580, filed on Apr. 8, 2009.

(51) Int. Cl.
| | | |
|---|---|---|
| *H04M 1/66* | (2006.01) | |
| *H04M 1/68* | (2006.01) | |
| *H04M 3/16* | (2006.01) | |
| *H04W 4/24* | (2009.01) | |
| *H04M 15/00* | (2006.01) | |
| *H04W 28/24* | (2009.01) | |
| *H04W 28/20* | (2009.01) | |
| *H04W 28/22* | (2009.01) | |

(52) U.S. Cl.
CPC ............ *H04M 15/8016* (2013.01); *H04W 4/24* (2013.01); *H04W 28/20* (2013.01); *H04M 15/00* (2013.01); *H04M 2215/7407* (2013.01); *H04M 2215/7414* (2013.01); *H04M 15/8011* (2013.01); *H04M 15/42* (2013.01); *H04M 15/43* (2013.01); *H04W 28/22* (2013.01); *H04M 2215/74* (2013.01); *H04M 15/80* (2013.01); *H04W 28/24* (2013.01)

USPC ............ 455/410; 455/404.1; 455/432.2; 455/418; 455/404.2; 370/328; 370/331; 370/352; 370/335; 370/312

(58) Field of Classification Search
USPC ................ 455/404.1, 410, 432.2, 418, 404.2, 455/556.1; 370/328, 331, 352, 335, 329, 370/254, 312
See application file for complete search history.

(56) References Cited

U.S. PATENT DOCUMENTS

| 6,463,274 B1 | 10/2002 | Robertson |
|---|---|---|
| 6,721,554 B2 | 4/2004 | Gnesda et al. |

(Continued)

FOREIGN PATENT DOCUMENTS

| WO | 02/32161 A2 | 4/2002 |
|---|---|---|
| WO | 02/37823 A2 | 5/2002 |

OTHER PUBLICATIONS

International Search Report, PCT/US2009/02676.

(Continued)

*Primary Examiner* — Joseph Arevalo
(74) *Attorney, Agent, or Firm* — Lerner, David, Littenberg, Krumholz & Mentlik, LLP

(57) ABSTRACT

The present invention pertains to improved communication quality and security of transmission in cellular communication networks. A customer has the option to pay different fees for different tiers of service relating to voice quality, bandwidth access, and different tiers of service relating to communications security. Higher tiers may guarantee a specific vocoder or bit rate is used, or guarantee a specific encryption protocol is use to ensure secure communications. Different tiers may be associated with customers' records for billing purposes. The network may afford high end devices higher voice quality and/or security via a lookup table indicating what level of service is associated with a given device. Calling or receiving devices may negotiate with each other to change to a more robust vocoder or bit rate to ensure a higher quality and/or security. Furthermore, the user may opt to change the quality and/or security level before or during a call.

3 Claims, 18 Drawing Sheets

(56) References Cited

U.S. PATENT DOCUMENTS

| | | |
|---|---|---|
| 2002/0072333 A1 | 6/2002 | Gnesda et al. |
| 2003/0103470 A1 | 6/2003 | Yafuso |
| 2004/0205004 A1 | 10/2004 | Bahl et al. |
| 2004/0221157 A1 | 11/2004 | Venkatachary et al. |
| 2005/0083872 A1 | 4/2005 | Kubler et al. |
| 2006/0159044 A1 | 7/2006 | Watanabe et al. |
| 2007/0167175 A1 | 7/2007 | Wong et al. |
| 2007/0204159 A1 | 8/2007 | Hara |
| 2007/0213010 A1 | 9/2007 | Konchitsky |
| 2008/0026723 A1 * | 1/2008 | Han .......................... 455/410 |
| 2008/0046266 A1 | 2/2008 | Gudipalley et al. |
| 2008/0076419 A1 | 3/2008 | Khetawat et al. |
| 2009/0023446 A1 | 1/2009 | Das |

OTHER PUBLICATIONS

International Search Report, PCT/US2009/02674.

International Search Report and Written Opinion, PCT/US09/02673, dated Mar. 24, 2010.

Supplementary European Search Report, EP 09739218, dated Jul. 7, 2011.

European Office Actiom for Application No. 09739218.7 dated Mar. 25, 2013.

Canadian Office Action for Canadian Application No. 2,723,168 dated Oct. 3, 2013.

European Office Action for Application No. 09739220.3 dated Aug. 2, 2013.

* cited by examiner

FIG. 6

| Make/Model Lookup Table |||
|---|---|---|
| Make | Model | Quality of Service |
| Motorola | Motorazr2 V8 | Middle Tier |
| Motorola | SLVR L7 Diamond | Highest Tier |
| Samsung | SCH-u340 | Lowest Tier |
| Samsung | Gleam | Middle Tier |
| LG | Chocolate | Middle Tier |
| Vertu | Constellation | Highest Tier |

MULTI-TIER SERVICE AND SECURE WIRELESS COMMUNICATIONS NETWORKS

CROSS-REFERENCE TO RELATED APPLICATIONS

The present application is a continuation of U.S. patent application Ser. No. 12/811,740, filed on Jul. 6, 2010, entitled "Multi-Tier Service And Secure Wireless Communications Networks," which application is a national phase entry under 35 U.S.C. §371 of International Application No. PCT/US2009/002674, filed Apr. 29, 2009, published in English, which claims the benefit of and priority from U.S. Provisional Application No. 61/125,971, entitled "Multi-Tier Service Wireless Communications Network," filed Apr. 30, 2008, U.S. Provisional Application No. 61/166,344, entitled "Multi-Tier Quality of Service Wireless Communications Networks," filed Apr. 3, 2009, and U.S. Provisional Application No. 61/167,580, entitled "Multi-Tier Service And Secure Wireless Communications Networks," filed Apr. 8, 2009, the entire disclosures of which are hereby incorporated by reference herein.

FIELD OF THE INVENTION

The present invention relates generally to wireless communications, and, more particularly, to creating multi-tier cellular phone communications system with different quality tiers of services and/or different security tiers of communication.

BACKGROUND OF THE INVENTION

The use of wireless communication has grown steadily for years, as wireless communication systems offer customers convenience and flexibility. Wireless cellular communication systems have been based on a wide variety of technologies, such as Time Division Multiple Access ("TDMA"), Global System for Mobile communications ("GSM"), Universal Mobile Telecommunications System ("UMTS"), and Code Division Multiple Access ("CDMA"). These technologies have evolved in an attempt to increase the number of subscribers that can be serviced at a given time (capacity) and also to improve the quality of service for subscribers. For instance, in recent years so-called third generation or "3G" cellular systems have been deployed to provide access to fast Internet and video. These include systems based upon standards and/or recommendations such as 3GPP and IMT-2000, which implement wideband CDMA ("WCDMA") or other high-bandwidth architectures.

Such systems offer customers a wide array of services, from basic voice communication to Short Message text messaging ("SMS"), Multimedia Messaging Service ("MMS"), email access and even video applications. FIG. 1 illustrates a conventional cellular wide-area network implementation 10 in which a number of cells 12 are each served by one or more base stations ("BSs") 14. Each base station may include a RF (Radio Frequency) transmission section and a baseband section for signal processing, call management, etc. A number of base stations are typically coupled to a mobile switching center ("MSC") or mobile telephone switching office ("MTSO") 16. In turn, the MTSO 16 is coupled to other network elements (not shown) and/or to the public switched telephone network ("PSTN") 18. User devices 20 include wireless telephones, laptop computers, Personal Digital Assistants ("PDAs") and other devices that have two-way voice, data and/or video capabilities. Such devices are often referred to as mobile units or mobile stations ("MSs").

As a given mobile station 20 travels or roams across a service provider's network, it typically sends and receives packets of data, including digitized voice, from multiple base stations. At any given time, primary communication (e.g., a voice call) is conducted between the mobile station and one base station, commonly referred to as the "serving base station." The serving base station may change from a first base station to a second base station as the location of the mobile station changes or other factors impinge on the signal between the mobile station and first base station. This process of switching between base stations is called handoff.

One of the major problems in cellular communication may be the unsatisfactory quality of service for subscribers. The signals transmitted between users' mobile stations and the network's base stations may be affected by a number of different factors, including blockage by buildings or terrain, multipath interference, movement and speed of the mobile station, handoffs between base stations, other mobile stations, etc; other network transmission characteristics, such as delay, jitter and uptime (availability) of the network affect signal quality as well. Furthermore, there is a finite bandwidth available at each base station or for a given cell in the wireless system. Thus, users are often subject to dropped calls and inferior voice quality, in contrast to the general high reliability of landline phone communications with plain old telephone service ("POTS").

The number of users who can be served by a cell or by a particular base station is impacted by the above mentioned issues and other factors. Service providers and mobile equipment manufacturers have attempted to deal with such issues with a number of different solutions. For instance, a serving base station may require mobile stations to perform power control to limit their transmission power. This helps to reduce the interference presented by transmissions from other mobile stations signals and therefore increase the signal to interference and noise ratio ("SINR") for other mobile stations. It can also enable more users on the system at a given time.

Mobile stations may also employ improved reception using so-called "RAKE" receivers to handle multipath propagation. See, for instance, "WCDMA for UMTS: Radio Access for Third Generation Mobile Communications," edited by Holma and Toskala, copyright 2000 by John Wiley & Sons, Ltd., the entire disclosure of which is hereby incorporated by reference herein. Another useful reference is "CDMA: Principles of Spread Spectrum Communication," by Andrew Viterbi, copyright 1995 by Addison-Wesley Publishing Co., the entire disclosure of which is hereby incorporated by reference herein.

Another solution to make a communication channel more efficient implements speech coding to reduce the amount of data that must be sent in order to reliably reproduce a user's voice. A general treatment of speech coding may be found in "Mobile Communication Systems," by Parsons and Gardiner, copyright 1989 by Blackie and Son Ltd., the entire disclosure of which is hereby incorporated by reference herein.

Speech coding in mobile telephony applications is typically done using a codec (coder/decoder). Voice codecs or voice coders ("vocoders") having varying levels of compression are often employed to reduce the required communication bandwidth by reducing the sampling rate of a voice signal. The terms codec and vocoder are used interchangeably herein.

Most of the frequencies that reproduce speech lie in the range of about 300 Hz to 3400 Hz. A band-limited signal, such as a speech signal, may be reconstructed from digital samples taken at or above the "Nyquist rate," which is a rate corresponding to two times the frequency bandwidth of the signal. This may require up to 64 Kb/s per user. However some vocoders can provide a reasonably good representation of voice with as little as 2.4 Kb/s of data rate.

Over the years, a number of different techniques have been used in different systems. By way of example only, one technique called code-excited linear prediction ("CELP") has been implemented by Qualcomm in its "QCELP" vocoders. Another popular technique is called the enhanced variable rate codec ("EVRC"). More recently, a variation called EVRC-B has been implemented in 3G systems. Other techniques include the selectable mode vocoder ("SMV") and adaptive multi-rate compression ("AMR").

One of the advantages of vocoders implementing such techniques is that the compression rate may be varied. Variable compression can result in reduced transmission overhead, which, in turn, can enable a service provider to accommodate more users on the wireless system. However, for any given vocoder the higher the compression level and the fewer bits used to represent the information, the less the output sounds like the original input (e.g., the voice of the user). In other words, the fidelity of the coded voice will decrease as the number of bits used to represent the voice decreases. While the user may not notice some degradation in quality, if the bit rate is reduced enough, or if a less robust vocoder is used, at some point the user may become aware of the reduced quality of the call.

Furthermore, in many applications a vocoder may change the bit rate one or more times during a call, and different calls may use different vocoders. Thus, a user may experience varying voice quality in the middle of a call or when making or receiving different calls. This can be frustrating to many users. Unfortunately, in conventional systems the user has no control over which vocoder is used or which level of compression is employed at any given time. Instead, these are typically mandated by standards and/or by the carrier's or service provider's own requirements or specifications.

In view of this, one can consider cellular telecommunications systems to be "one size fits all" types of systems. All mobile phones operating on a given network are subject to the same constraints, regardless of whether the mobile phone was given to the user for free as part of a particular plan or whether the user paid hundreds of dollars or more for the phone. There is usually no differentiation, and bandwidth and transmission characteristics mentioned above are imposed on all subscribers.

By way of example only, certain manufacturers have offered luxury cellular phones costing many thousands of dollars. Nokia, for one, launched a company called Vertu to sell high end phones. The Vertu Constellation, which is finished in 18 kt gold, retailed for $20,000. An even more expensive phone is the Motorola SLVR L7 Diamond, which was priced at $75,000. And the Diamond Crypto Smartphone has been reported to cost $1.3 million. Nonetheless, in existing systems users of such phones are subject to the same performance problems and constraints as are users of low priced or even free phones.

Vocoder performance is only one aspect that affects quality of service ("QoS") for a subscriber. As soon as signal leaves a mobile station, it is traveling through many spans and even networks until it reaches its destination, which may be another mobile station. Such transmission characteristics as network availability (which often relates to equipment protection), signal delay, jitter and dropped packets rate are the major factors that affect the grade of service quality. In tradition cellular networks, there is no differentiation of users by quality of service.

As a rule, the same network infrastructure may support business and residential users, as well as users with sensitive information. Breaches of security are a very common fact in cellular networks. In the traditional network infrastructure, there is no differentiation of users by the security level. This may result in service degradation and unwillingness of potential users to subscribe to the service.

It may be useful to note that in the literature on wireless communications the term "multi-tier cellular network" usually refers to overlaying cells of different size such as micro-cells and macro-cells in a two-tier network, which are commonly used today. This is not the meaning of "multi-tier" network as it is used herein. A "multi-tier" network as used herein refers to a wireless communication network with different tiers of service, wherein each tier of service corresponds to a different level of service, such as quality of service (QoS) or different levels of security, each tier priced differently. In the literature, such networks are often referred to as "multi-class wireless networks." For the purposes of this disclosure the terms "multi-tier" and "multi-class" are used interchangeably as synonymous.

In view of the above, a need exists for improved service quality in cellular communications systems and other wireless architectures. A further need exists for a multi-tier cell phone service offering customers guaranteed minimum bandwidth and level of quality of communication (defined also by latency, jitter, and network availability and dropped rate of the calls). Yet another need exists for custom service plans allowing customers to purchase custom level of cell phone communication service, which guarantees a minimum bandwidth and level of quality of communication (defined also by latency, jitter, network availability and dropped rate of the calls), corresponding to a particular tier in a multi-tier communication system. Still another need exists to match the quality of cellular phone communications to the quality and/or price level of a handset used by a customer. A further need exists for custom service plans allowing customers to purchase custom level of cell phone communication service, which guarantees secure communications in the public-accessible cellular network; and to match a security level to a particular fee structure of the service.

SUMMARY OF THE INVENTION

In accordance with one embodiment of the present invention, a method of providing telecommunication service in a wireless communication network comprises: providing a plurality of service levels, each of the plurality of service levels corresponding to a different quality and/or security level of communication between a wireless mobile station and a base station of the wireless communication network, and each of the plurality of service levels also corresponds to different service charges in an overall pricing structure; providing an option to a customer to select one of the plurality of service levels for use with the wireless mobile station; storing the selected service level in a customer record associated with the wireless mobile station; and configuring the customer record to bill the customer a predetermined price for the selected service level.

In accordance with one embodiment of the present invention, a wireless communication system comprises at least one base station; at least one network server operatively connected to the at least one base station; a data storage device operatively connected to the at least one network server; a customer record database stored on the storage device for maintaining records of a plurality of customers of the wireless communication system and for identifying at least one wireless mobile station associated with each of the plurality of customers; and a plurality of service quality and/or security levels, each of the plurality of service levels corresponding to a different quality and/or security level of communication and to a different service fee in an overall pricing structure.

In accordance with one embodiment of the present invention, a method of setting a service level in a cellular communication network comprising a plurality of base stations, a plurality of mobile stations and a network server, the network server having a customer record database associated therewith, the method comprises receiving an incoming call indication by a first one of the plurality of mobile stations, the first mobile station being registered with the cellular communication network; determining a service level (both quality and/or security) associated with the first mobile station; and selecting at least one of a vocoder and a vocoder bit rate for use by the first mobile station, the selection being determined by the first mobile station's service level agreement; and selecting at least one security level associated with the first mobile station, the selection being determined by the first mobile station service level agreement.

In accordance with a further embodiment of the present invention, a method of communicating in a cellular communication network comprising a plurality of base stations, a plurality of mobile stations and a network server is provided. The network server has a customer record database associated therewith. The method comprises initiating a call scenario for a first one of the plurality of mobile stations, the first mobile station being registered on the cellular communication network; identifying a service level associated with the first mobile station; selecting at least one of a vocoder and a vocoder bit rate for use by the first mobile station, the selection being determined by the identified service level; and communicating with the cellular communication network using the selected vocoder with the selected vocoder bit rate in accordance with the service level agreement purchased by a subscriber.

In accordance with a further embodiment of the present invention, a method of communicating in a cellular communication network comprising a plurality of base stations, a plurality of mobile stations and a network server is provided. The network server has a customer record database associated therewith. The method comprises initiating a call scenario for a first one of the plurality of mobile stations, the first mobile station being registered on the cellular communication network; identifying a security level associated with the first mobile station; selecting at least one of a vocoder and vocoder guaranteed security level for use by the first mobile station, the selection being determined by the identified security level; and communicating with the cellular communication network using the selected vocoder in accordance with the service level agreement purchased by a subscriber.

In accordance with a further embodiment of the present invention, a method of communicating in a cellular communication network comprising a plurality of base stations, a plurality of mobile stations and a network server is provided. The network server has a customer record database associated therewith. The method comprises initiating a call scenario for a first one of the plurality of mobile stations, the first mobile station being registered on the cellular communication network; identifying a security level associated with the first mobile station; selecting at least one of a vocoder and vocoder guaranteed security level and service quality level for use by the first mobile station, the selection being determined by the identified service quality level and security level; and communicating with the cellular communication network using the selected vocoder.

In accordance with a further embodiment of the present invention, a method of communicating in a cellular communication network comprising a plurality of base stations and a network server having customer record database, the method comprises receiving an incoming call from a first one of a plurality of mobile stations, the first mobile station being registered on the cellular communication network; determining a service level associated with the first mobile station; selecting a predetermined minimum bandwidth for use by the first mobile station, the selection being determined by the service level of the first mobile station; allocating the selected predetermined minimum bandwidth for use by the first mobile station; and communicating with the first mobile station using the selected bandwidth as per a Service Level Agreement ("SLA").

In accordance with yet another embodiment of the present invention, a mobile station for operation on a multi-tier wireless communication network providing a plurality of quality of service and security tiers corresponding to different levels of quality of wireless communications and security, the wireless mobile station comprises a housing; a microphone positioned within the housing; an analog-to-digital converter disposed within the housing and operatively connected to the microphone; a digital signal processor disposed within the housing and operatively connected to the analog-to-digital converter; an encryption/decryption device disposed within the housing and operatively connected to transceiver; a receiver disposed within the housing and operatively connected to the digital signal processor; a transmitter disposed within the housing and operatively connected to the digital signal processor; an antenna at least partially received within the housing and operatively connected to the transmitter and the receiver; and at least one vocoder operable to code and decode signals corresponding to the plurality of service tiers on the wireless communication network.

In another embodiment, a base station is provided for use in a multi-tier wireless communication network providing a plurality of service tiers corresponding to different levels of quality and security of wireless communications. The base station comprising a tower; an antenna positioned on the tower; a transceiver for transmitting and receiving data packets to and from mobile users in the wireless communication network; and a processor operatively coupled to the transceiver and programmed to select a vocoder for corresponding tier communication in response to a phone call from a wireless mobile station based on the record in a lookup table.

In another embodiment, a method of providing telecommunication service in a wireless communication network is provided. The method comprises providing a plurality of service levels, each of the plurality of service levels corresponding to a different quality level of communication between a wireless mobile station and a base station of the wireless communication network, and each of the plurality of service levels also corresponds to a different service fees in an overall pricing structure; providing an option to a customer to select one of the plurality of quality service levels for use with the wireless mobile station; storing the selected quality service level in a customer record associated with the wireless mobile station; and configuring the customer record to bill the customer a predetermined price for the selected service level.

In one example, each quality level of communication is a quality level of an audio signal sent or received by the wireless mobile station. In an alternative, the audio signal quality level corresponds to a particular vocoder bit rate. In another alternative, the audio signal quality level corresponds to a selection of a vocoder used by the wireless mobile station. In a further alternative, the audio signal quality level corresponds to a minimum guaranteed bandwidth used by the wireless mobile station. In yet another alternative, the audio signal quality level relates to a dropped call rate. In another alternative, the audio signal quality level corresponds to at least one of a frequency range of an incoming audio signal, a sampling frequency of the incoming audio signal, and a dynamic range of the incoming audio signal. In a further alternative, the audio signal quality level corresponds to a predetermine level of network protection between mobile stations involved in a conversation; and the network protection ranges from a basic protection level to a 1:1 protection level to guarantee a quality of service (QoS) purchased by a subscriber. In another alternative, the audio signal quality level corresponds to a service level determined by a contract between a service provider and a subscriber including at least one of a maximum allowed latency and a jitter value guaranteed by the service provider.

In another example, the wireless communication network reserves at least one of a predetermined bandwidth and a protection level for at least some of the plurality of quality service levels. In a further example, the wireless communication network is a cellular communication network.

Another embodiment is directed to a wireless communication system, comprising at least one base station; at least one network server operatively connected to the at least one base station; a data storage device operatively connected to the at least one network server; a customer record database stored on the storage device for maintaining records of a plurality of customers of the wireless communication system and for identifying at least one wireless mobile station associated with each of the plurality of customers; a plurality of quality service levels, each of the plurality of quality service levels corresponding to a different quality level of communication and to a different price in an overall pricing structure; and a plurality of security levels, each of the plurality of security levels corresponding to a different security level of communication and to a different service fee in the overall pricing structure.

In one example, the customer record database is updatable to reflect a selected one of the quality of service levels and a selected one of the security levels for a given customer. In another example, each quality level of communication is a quality level of an audio signal to be sent or received by a mobile station of a given customer. In a further example, the audio signal quality level corresponds to a vocoder bit rate. In another example, the audio signal quality level corresponds to a selection of a vocoder of a user's mobile station. In yet another example, the audio signal quality level corresponds to a minimum guaranteed bandwidth of a user's mobile station. And in another example, the audio signal quality level corresponds to a particular communication channel availability according to a contract with a service provider.

Another embodiment is directed to a method of setting a quality service level in a cellular communication network comprising a plurality of base stations, a plurality of mobile stations and a network server, the network server having a customer record database associated therewith. The method comprises receiving an incoming call indication by a first one of the plurality of mobile stations, the first mobile station being registered with the cellular communication network; determining a quality service level associated with the first mobile station; and selecting at least one of a vocoder and a vocoder bit rate for use by the first mobile station, the selection being determined by the first mobile station's quality service level.

Another method is directed to setting a security level in a cellular communication network comprising a plurality of base stations, a plurality of mobile stations and a network server, the network server having a customer record database associated therewith. The method comprises receiving an incoming call indication by a first one of the plurality of mobile stations, the first mobile station being registered with the cellular communication network; determining a security level associated with the first mobile station; and selecting a security protocol for use by the first mobile station, the selection being determined by the first mobile station's security level.

In one example, determining the security level includes querying the customer record database to identify the first mobile station's security level. In another example, determining the security level includes determining a model number of the mobile station; and accessing a lookup table using the model number to identify the security level associated with the first mobile station's model number. In a further example, the method further comprises receiving a service level identifier from the first mobile station by a first one of the plurality of base stations of the cellular communication network; validating the service level identifier; selecting a security protocol for use by the first base station, the selection being determined by the validated service level identifier; and transmitting a service level confirmation to the first mobile station.

In another example, the plurality of mobile stations further includes a second mobile station; determining further comprises determining a security level of the second mobile station; and selecting further comprises identifying a higher tier security service level from among the first and second mobile station security levels; and selecting a security protocol for use by the first and second mobile stations, the selection being determined by the higher tier security service level. In a further example, the plurality of mobile stations further includes a second mobile station; determining further comprises determining a security level of the second mobile station; and selecting further comprises identifying a lower tier service level from among the first and second mobile station security levels; and selecting a security protocol for use by the first and second mobile stations, the selection being determined by the lower tier security service level.

In another example, the plurality of mobile stations further includes a second mobile station, wherein the determining includes determining a service level of the second mobile station and the selecting further comprises identifying a higher tier service level from among the first and second mobile station service levels; selecting at least one of a vocoder and a vocoder bit rate for use by the first and second mobile stations based upon the higher tier service level; adaptively adjusting a given service level for a higher tier subscriber device among the first and second mobile stations so that the higher tier subscriber device is configured communicate at a lowest tier service level; adaptively measuring a quality of transmission between the first and second mobile stations; adaptively adjusting a quality of signal level to a next higher signal level if a transcoder reports signal degradation; and repeating the identifying, selecting, adaptively adjusting the given service level, adaptively measuring and adaptively adjusting the quality of signal level operations until a higher service level of a subscriber's mobile station is satisfied or no the further adjustment of the service level of the subscriber's mobile station is possible.

Another embodiment is directed to a method of communicating in a cellular communication network comprising a plurality of base stations, a plurality of mobile stations and a network server, the network server having customer record database associated therewith. The method comprises initiating a call scenario for a first one of the plurality of mobile stations, the first mobile station being registered on the cellular communication network; identifying a service level associated with the first mobile station; selecting at least one of a vocoder and a vocoder bit rate for use by the first mobile station, the selection being determined by the identified service level; and communicating with the cellular communication network using the selected vocoder or the selected vocoder bit rate.

In one example, identifying the service level includes retrieving a predetermined quality of service level stored in a memory of the first mobile station. In another example, identifying the service level includes retrieving a predetermined security level stored in a memory of the first mobile station. In a further example, the memory is a nonvolatile memory of the first mobile station. In another example, the memory is a subscriber identity module of the first mobile station. In yet another example, the call scenario is initiated by a user of the first mobile station making an outgoing call. In another example, selecting the at least one of the vocoder and the vocoder bit rate is done at the first mobile station. In a further example, the call scenario is an incoming call received by the first mobile station. And in another example, the plurality of mobile stations further comprises a second mobile station; the incoming call is initiated by the second mobile station; and selecting further includes selecting at least one of a vocoder and a vocoder bit rate for use by the second mobile station for the incoming call.

Another embodiment is directed to a method of communicating in a cellular communication network comprising a plurality of base stations and a network server having customer record database. The method comprises receiving an incoming call from a first one of a plurality of mobile stations, the first mobile station being registered on the cellular communication network; determining a service level associated with the first mobile station; selecting a predetermined minimum bandwidth for use by the first mobile station, the selection being determined by the service level of the first mobile station; allocating the selected predetermined minimum bandwidth for use by the first mobile station; and communicating with the first mobile station using the selected bandwidth.

In one example, the service level of the first mobile station is stored in a customer record of the customer record database. In another example, the selected predetermined bandwidth is allocated for the duration of the incoming call. In a further example, the incoming call includes a bandwidth indicator that is received by a first one of the plurality of base stations. In this case, the method may further comprise passing the bandwidth indicator from the first base station to the network server; validating the bandwidth indicator at the network server by comparing the bandwidth indicator to a bandwidth value associated with the first mobile station that is stored in the customer record database; and if the bandwidth indicator is validated, enabling the allocation of the selected predetermined minimum bandwidth for use by the first mobile station.

Another embodiment is directed to a method of providing a multi-tier telecommunication service for mobile stations in a cellular communication network including a plurality of base stations. The method comprises providing a plurality of communication modes, each of the plurality of communication modes having a different quality level of communication between mobile stations utilizing the cellular communication network and the plurality of base stations of the cellular communication network; and providing a plurality of service tiers, each of the plurality of service tiers corresponding to one of the plurality of communication modes, wherein each of the plurality of service tiers also corresponds to a different price so that a first one of the tiers corresponding to a communication mode with a higher quality level of communication is more expensively priced than a second one of the tiers corresponding to a communication mode with a lower quality level of communication.

A further embodiment is directed to a method of providing a multi-tier telecommunication service for mobile stations in a cellular communication network including a plurality of base stations. The method comprises providing a plurality of communication modes, each of the plurality of communication modes having a different security level of communication between mobile stations utilizing the cellular communication network and the plurality of base stations of the cellular communication network; and providing a plurality of security tiers, each of the plurality of security tiers corresponding to one of the plurality of communication modes, wherein each of the plurality of security tiers also corresponds to a different price so that a first one of the tiers corresponding to a communication mode with a higher security level of communication is more expensively priced than a second one of the tiers corresponding to a communication mode with a lower security level of communication.

In one example, the method further comprises providing a first mobile station for use in the cellular communication network, the first service tier corresponding to the communication mode with the higher security level of communication being associated with the first mobile station; providing a second mobile station for use in the cellular communication network, the second service tier corresponding to the communication mode with the lower security level of communication being associated with the second mobile station; and offering the first mobile station for sale or lease at a higher price than the second mobile station.

In another example, the method further comprises selling or leasing at least one of the first and second mobile stations to a customer; and storing each security tier associated with the at least one of the first and second mobile stations in a customer record associated with the sold or leased at least one of the first and second mobile stations. In this case, the method may further comprise configuring the customer record to bill the customer a predetermined price for each stored security tier.

In another embodiment, a method of procuring multi-tier cellular telecommunication service in a cellular communication network comprising a plurality of base stations and a mobile station is provided. The method comprises identifying a plurality of service tiers, each of the tiers corresponding to a different security level of communication between the mobile station and the plurality of base stations of the cellular communication network; and selecting one of the service tiers from among the plurality of service tiers. In one example, each of the plurality of service tiers also corresponds to a different price, so that a premium tier corresponding to a higher security level of communication is priced higher than a tier corresponding to a lower security level of communication. In an alternative, the method further comprises purchasing by a customer the selected service tier for use with the mobile station. In another alternative, the selected service tier is the premium service tier and the method further comprises paying a predetermined higher price for the selected premium service tier. And in a further alternative, the selected service tier is a premium security tier and the method further comprises paying a predetermined higher price for the selected premium security tier.

Another embodiment is directed to a mobile station for operation on a multi-tier wireless communication network providing a plurality of service tiers corresponding to different levels of secured wireless communications. The mobile station comprises a housing; a microphone positioned within the housing; an analog-to-digital converter disposed within the housing and operatively connected to the microphone; a digital signal processor disposed within the housing and operatively connected to the analog-to-digital converter; a receiver disposed within the housing and operatively connected to the digital signal processor; a transmitter disposed within the housing and operatively connected to the digital signal processor; an antenna at least partially received within the housing and operatively connected to the transmitter and the receiver; and at least one vocoder operable to code and decode signals corresponding to the plurality of service tiers on the wireless communication network.

In one example, the plurality of service tiers includes a premium service tier, the at least one vocoder is operable to code and decode signals corresponding to the premium service tier, and wherein the premium service tier is associated with a higher security level of wireless communications. In another example, the at least one vocoder is programmed to provide a higher bit rate encoding scheme for a higher security of voice communication. In a further example, the mobile station further comprises memory for storing a security indicator, the memory being operatively coupled to the transmitter, wherein upon communication to a base station of the wireless communication network, the security indicator is retrieved from the memory and passed to the base station, whereby the security indicator instructs the base station to select an appropriate vocoder for a predetermined security level of communication corresponding to the security indicator.

A further embodiment is directed to a base station for use in a multi-tier wireless communication network providing a plurality of service tiers corresponding to different security levels of wireless communications. The base station comprises a tower; an antenna positioned on the tower; a transceiver for transmitting and a receiver for receiving data to and from mobile users in the wireless communication network; and a processor operatively coupled to the transceiver and the receiver and programmed to select a vocoder for premium tier communication in response to a phone call from a wireless mobile station based on the record in a lookup table. In one example, the lookup table is one of a phone number identifier and a model of the wireless mobile station.

A further embodiment is directed to a wireless communication system comprising at least one base station; at least one wireless mobile station capable of communicating with said at least one base station using radio frequency communication; mobile switching center; wireless communication network linking said at least one base station and said at least one wireless mobile station with said mobile switching center; wherein said wireless communication network provides a plurality of tiers of wireless service corresponding to a different security level of communication between a wireless mobile station and a base station of the wireless communication network, and each of the plurality of service security levels also corresponds to a different price in an overall pricing structure.

In yet another embodiment, a cellular telephone network comprises a plurality of base stations and a plurality of cellular phones, and an improvement comprises a multi-tier service having a plurality of communication modes utilizing at least one of a secure communication channel, a vocoder and a vocoder bit rate, wherein a premium-tier mode corresponds to a more secure communication channel; and a plurality of service tiers priced differently, wherein each of the plurality of service tiers correspond to one of the plurality of communication modes so that a more expensive service tier corresponds to a more secure communication mode.

In a further embodiment, a cellular communication network comprises at least one base station; at least one mobile station; at least one network server having customer record database; means for receiving an incoming call from one of said at least one mobile station registered on the cellular communication network; means for determining a service security level associated with said one of said at least one mobile station; means for selecting a predetermined secure communication channel for use by said one of said at least one of mobile station, the selection being determined by said one of said at least one of mobile station's service level; means for allocating the selected predetermined secure communication channel for use by said one of said at least one of mobile station; and means for communicating with said one of said at least one of mobile station using the selected secure communication channel.

In accordance with another embodiment of the invention, a cellular communication network comprises at least one mobile station; at least one base station having a microwave antenna for receiving an incoming call by one of said at least one mobile station registered on the cellular communication network; at least one network server, said network server having customer record database sufficient to determine a service level associated with said one of said at least one mobile station; a lookup table for selecting at least one of a vocoder and an encryption bit rate for use by said one of said at least one of mobile station, the selection being determined by said one of said at least one of mobile station's service level; and a radio-frequency transmitter operatively connected with the base station for communicating between said one of said at least one of mobile station and the cellular communication network using the selected vocoder or the selected encryption bit rate.

A further embodiment is directed to a wireless mobile station for communicating in a cellular communication network having at least one base station and at least one network server, the network server having customer record database. The wireless mobile station comprises a transmitter for transmitting an outgoing call by the mobile station registered on the cellular communication network; means for querying the customer record database to determine a service security level associated with said one of said at least one mobile station; means for selecting at least one of a vocoder and an encryption bit rate for use by said one of said at least one of mobile station, the selection being determined by said one of said at least one of mobile station's service level; and means for communicating with the cellular communication network using the selected vocoder or the selected encryption bit rate.

Another embodiment is directed to an improved method for wireless transmission of telecommunication signals, comprising providing a plurality of signal generation modes, each said mode corresponding to at least one of a different bandwidth, a different vocoder and a different encryption bit rate, where each said mode yields a different signal encryption level; providing a pricing structure for use of said method wherein the price for signal transmission using each of said modes is related to the signal encryption level thereof; and permitting selection of a signal generation mode by users of said method.

In a further embodiment to a cellular telecommunication system, an improvement comprises means for providing a plurality of signal generation modes, each said mode corresponding to at least one of a different bandwidth, a different vocoder and a different encryption bit rate, where each said mode yields a different signal encryption; means for providing a pricing structure for use of said method wherein the price for signal transmission using each of said modes is related to the signal encryption level thereof; and means for permitting selection of a signal generation mode by users of said method.

And in another embodiment, a method of providing telecommunication service in a wireless communication network comprises providing a plurality of service levels, each of the plurality of service levels corresponding to a different security level of communication between a wireless mobile station and a base station of the wireless communication network, each of the plurality of service levels also corresponding to a different service fee in an overall pricing structure; providing an option to a customer to select one of the plurality of security levels for use with the wireless mobile station; storing the selected security level in a customer record associated with the wireless mobile station; and configuring the customer record to bill the customer a predetermined price for the selected security level.

In one example, a signal security level used during communication by the wireless mobile station corresponds to at least one of the security levels determined by a contract between a service provider and a subscriber security levels. And in a further example, the wireless communications network reserves a predetermined security level for at least some of the plurality of security levels.

Unless expressly stated to the contrary, each of the embodiments, examples and alternative modes of operation herein may be used in combination with any other aspects of the invention.

BRIEF DESCRIPTION OF THE DRAWINGS

FIG. 6 illustrates a lookup table in accordance with aspects of the present invention.

DETAILED DESCRIPTION

Figure 1:
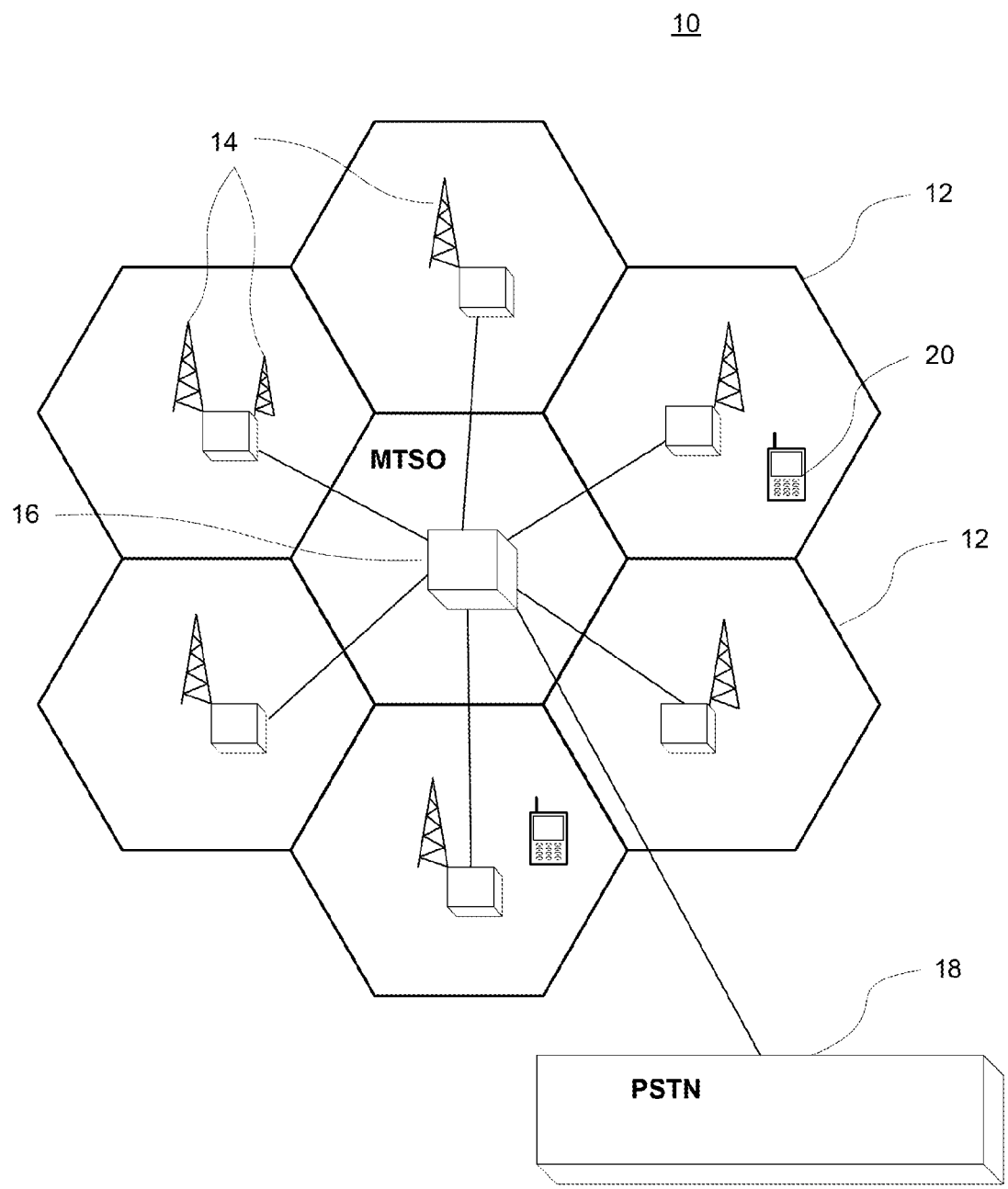
FIG. 1 illustrates conventional cellular system architecture.

The aspects, features and advantages of the present invention will be appreciated when considered with reference to the following description of exemplary embodiments and accompanying figures.

In accordance with aspects of the invention, it is recognized that wireless communication customers who either have high priced phones or who spend a good deal of time on the phone, such as business people and teenagers, may be willing to pay for an improved quality level of service and/or security that differentiate them from other subscribers. This is akin to the free market approach in general where consumers are able to purchase various levels of service commensurate with their willingness and ability to pay for them.

For example, while many people fly coach class, some people are willing to pay for business class or first class, which may be significantly more expensive, if they desire and can afford a higher level of service. Even some hospitals have separate floors for "VIP" patients who receive special services for an additional price.

In another example, in the existing cellular networks, consumers/businesses are purchasing various service features for an additional fee. Those features, by an example only, may include coverage, Internet access, email, multimedia and GPS services.

In the cable and satellite television industries, consumers are free to choose between less costly basic services and packages, which offer more channels and/or better quality. For instance, customers may choose HDTV digital service instead of basic digital service. And people who wish to buy broadband Internet service can often subscribe through their cable (or PSTN) service provider. Here they may share the same bandwidth with other subscribers or may pay for access to a higher bandwidth level. Broadband users may also buy guaranteed bandwidth with various service levels using DSL (e.g., Fractional T1, T1, T3 or other speeds).

Another free market situation exists where consumers are given the option of using a private toll highway versus a public non-toll road. Some cities and states provide drivers with the option to use private toll highways with an expectation of less congestion and a quicker trip for those who are willing to pay for it. It can be seen that consumers who wish to purchase such services have a choice as to what tier of service they are willing to pay for.

In accordance with aspects of the present invention, multi-tiered service offerings are provided for cellular communication systems. In exemplary embodiments, a customer may choose between different tiers of service quality or/and security levels, which may offer different guaranteed levels of voice quality and/or bandwidth and/or security as stipulated by a contract between a service provider and a user.

By the way of example only, Table 1 illustrates a possible differentiating of subscribers based on quality of services, depicting classes of services and their characteristics. This table illustrates a possible service offering when a service provider offers three classes of service quality, i.e., Class I, Class II and Class III, the highest being Class I. Subscribers can purchase various "quality of the service" packages. For example, for a subscriber of Class I, the provider selects 1:1 protection facilities to support availability of the service not less than 99.95%, bandwidth for transmission with a vocoder rate not less than 12 Kb/s, guaranteed latency not more than 130 ms and jitter not more than 10 ms. The percentage of dropped calls should be limited to not more than 3%. All these characteristics will be referred to SLAs—Service Level Agreements—that may be clearly stipulated in the service contract. In addition, as a part of the package, a subscriber can also purchase a particular security level for his/her device's operation on the network's facilities. For example, Security Level I may include the highest level of security with sophisticated encryption. Several intermediate security levels may also be provides, as well as a service level that includes only basic security measures.

TABLE 1

| Class of Service/ Characteristics | Availability (%)/Facility Protection | Bandwidth Kb/s | Latency/ Jitter (ms) | Percent of Dropped Calls (Max) |
|---|---|---|---|---|
| I | 99.95% 1:1 protection | 12 and up | 130/10 | 3 |
| II | 99.9% 1:N protection | 7-8 | 180/20 | 5 |
| III | 98.5% Protection is limited | 2-4 | 220/35 | 7-8 |

Figure 2:
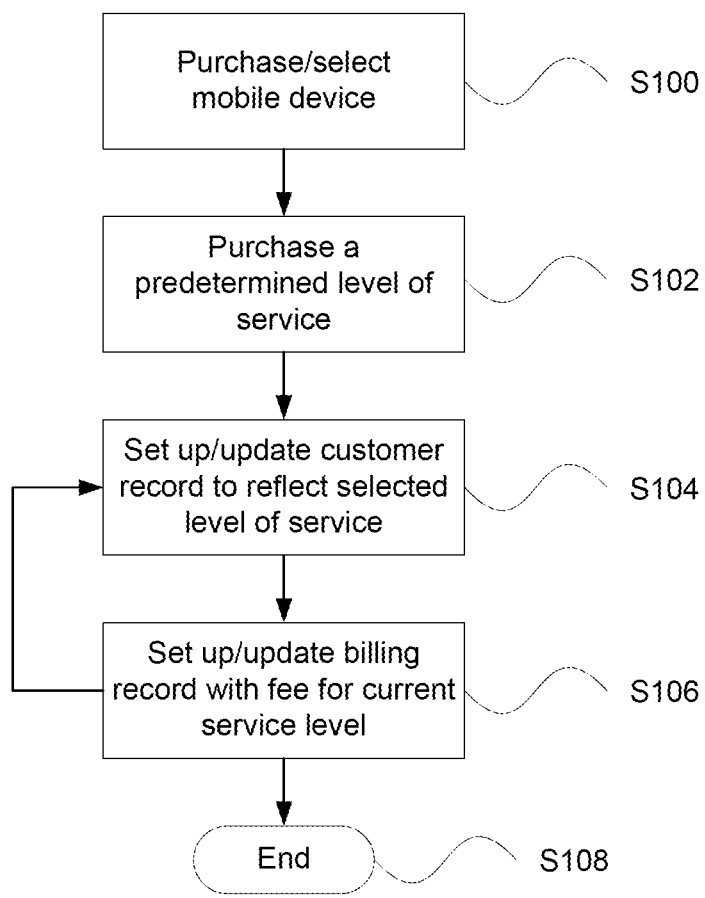
FIG. 2 illustrates a call quality flow diagram in accordance with aspects of the present invention.

FIG. 2 illustrates a flow diagram 100 in accordance with one embodiment of the present invention. Here, as shown at step S100, the user may purchase, rent or otherwise obtain/receive a mobile device. At step S102, the user selects a predetermined tier of service (which he/she agreed to pay for as per a service contract). Each tier of service may directly correspond to at least one Class of Service (as per specific SLAs), which a service provider offered and a user purchased, each being differentiated by transmission parameters as explained above. Each tier may also correspond to a particular voice quality level and a bandwidth amount, as well as correspond to a security level.

By way of example only, the voice quality level may be associated with a particular bit rate for a codec or vocoder used by the mobile device and the communicating network infrastructure such as a base station or mobile switching center as well as network facilities supporting such infrastructure. For instance, the system may offer a number of bit rates ranging from, e.g., 4.75 Kb/s up to 12.2 Kb/s for a given vocoder. One or more intermediate rates may be provided between the lowest and highest bit rates. The lowest bit rate may correspond to the lowest quality or fidelity of the coded voice signal, while the highest bit rate may correspond to the highest quality or fidelity of the coded voice signal. Multiple vocoders may be offered in a given mobile station (or it may be one vocoder with programmable bit rate settings). Each vocoder may support one or more bit rates, such as 4.5 kbps, 5.5 kbps, 6.5 kbps, 7.5 kbps, 8.5 kbps, 9.5 kbps, 10.5 kbps, 11.5 kbps, 12.5 kbps or any increments between these bit rates. Of course, it should be understood that higher and/or lower bit rates may also be supported.

By way of example only, the security level may be associated with the particular settings of the subscriber's MS and/or BS settings that correspond to the selected by a subscriber service package. Security level implementations may employ different techniques, starting with very simple (or no additional security), and going further to sophisticated encryption (but limited by laws applicable to public safety).

While quality or fidelity may be subjective to some degree, a number of techniques have been developed to quantify the evaluation process. For instance, British Telecom developed a call clarity index ("CCI"). Another known technique is the mean opinion score ("MOS"). Yet another technique, called perceptual evaluation of speech quality ("PESQ"), has been promulgated by the ITU. See, for instance, ITU-T Recommendation P.862. A more recent E-model is ITU Standard G.1072 that quantifies what is essentially a subjective judgment: a user's opinion of the perceived quality of a voice transmission. Such techniques generally operate on a speech quality scale ranging from 1 to 5, with 1 being bad, being poor, 3 being fair, 4 being good and 5 being excellent. Any such quantifiable technique may be used in accordance with the embodiments of the present invention.

In one example, the voice quality level may correspond to a value or range of values on a speech quality scale. In one example, the user may select a first voice quality level of between 4-5, a second quality level of between 3-4, a third voice quality level of between 2-3 and a fourth voice quality level of between 1-2. In an exemplary pricing plan, the first voice quality level (e.g., between 4 and 5) is the most expensive to purchase, with the price dropping for each lower voice quality level. Of course, it should be understood that these voice quality levels are merely exemplary and other gradations may be employed. For instance, a middle tier voice quality level may be between 3.5 and 4.0, an upper tier voice quality level may be between 4.0 and 4.5, and the highest tier voice quality level may be between 4.5 and 5.0.

In another example, the security level may correspond to a value of security offerings. The user can select a highest security level, purchase a Service Plan that supports this security level, and insure high resistance of his/her calls to eavesdropping and other security breaches. In exemplary security offerings, many business people may look to secure their mobile conversations, which usually can be intercepted by unauthorized parties.

In the case where the tiers of service correspond to a bandwidth amount, the user may be given the option of selecting between any number of predetermined bandwidth amounts. The specific bandwidths may be system dependent in view of the amount of spectrum available at a given cell or base station. In one example, the system may permit the user to use bandwidth that would otherwise be allocated to one or more other users. Thus, as fewer users may be accommodated, the higher bandwidth user may pay a higher fee for access to the additional bandwidth.

Such aggregation of bandwidth may be advantageous to ensure a higher bit rate for a given vocoder or for other applications. By way of example only, the user may wish to send or receive real-time video content. The bandwidth required may depend on the display size of the mobile station. Bandwidth aggregation helps to ensure that the user views the video at the desired video and audio quality levels. For instance, a given application may require a high definition video quality with 7.1 channel audio.

In yet another alternative, the tiers of service may correspond to a dropped call rate. For instance, if a cellular system typically averages a dropped call rate of X %, then the tiers of service may guarantee the user different dropped call rates. By way of example only, a basic (lowest) tier may guarantee that a user will never observe a dropped call rate more than X % at no additional charge, while a mid-level tier may guarantee a maximum dropped call rate of X*0.9 (a 10% improvement in dropped call rate). A high level tier may guarantee a dropped call rate not more than X*0.75 (a 25% improvement in dropped call rate.) And a "premier" tier may guarantee a dropped call rate not more than X*0.5 (a 50% improvement over the typical dropped call rate). While several tiers have been provided in this example, it should be understood that different tiers and/or ranges of tiers may also be provided. For instance, a series of three or more tiers may each have a set percentage improvement between each tier (e.g., a 5%, 10%, 15%, 20% or 25% improvement). Furthermore, the dropped call rate may be set once to cover all networks the mobile device may operate on, or it may vary from network to network depending on the specific architecture and other design factors of each network.

The user may buy service with a level of security that corresponds to his/her specific job or other functions. By a way of example only, a CEO may purchase a special high security level to assure that his/her conversations are secured and avoid even a possibility of economic espionage.

The service package may include different combinations of Security Levels and Quality of Transmission Levels. As an example, a subscriber may need the highest Security Level combined with a middle-range Quality of Service Level. In yet in another example, a subscriber may purchase only a particular bandwidth.

The user may purchase a given level of service quality and security at the time he or she receives the cellular phone, for instance at a kiosk in the mall, at the service provider's store, etc. Alternatively, the service of any level may be purchased upon activation of the phone, such as with over the air activation. When the service provider sets up the customer's account record, the record will reflect the appropriate level of service associated with his or her mobile device, as shown at step S104 of FIG. 2.

In another example, after the phone is activated the user may run an applet or other program on the phone, or otherwise send a command from the phone to the network via a serving base station in order to request a change in the user's quality of service and/or security levels. The user may press an actuator or select an option in a software menu to request the change. And as shown in step S104, the customer's account record is updated to reflect the new quality of service and/or security levels.

A further option available to the user is the ability to set or change the service level via a web-based interface. For instance, the user may access his or her account record through a website of the appropriate service provider. This may be done directly through the user's mobile station or using a separate device such as a laptop or desktop computer. Once the account is accessed, the user may have the option to view the existing service quality level for one or more mobile devices associated with the user's account.

The user is desirably able to change the service quality level for one or more of the mobile devices through a graphical user interface. Once a change has been made, the customer's account record is updated to reflect the new service level at step S104. Changes may be done globally for all of the user's devices at the same time or may be done separately for one or more of the user's devices. Thus, the user may set the voice quality rate of his or her cell phone to a first tier and set the voice quality rate and/or video quality rate of his or her PDA or "smartphone" to a second tier.

For selection of a security level, it is desirable to set-up a security level during the phone or other devices activation. Such information can be stored in the customer records as shown in FIG. 2. A subscriber may pay a premium for such selection, but it may attract a wide category of business people. As an example, security options may not be offered to a wide audience due to possible criminal use. It may be a choice for various large and small business institutions as well as for government organizations.

In yet another alternative, the quality service level in the customer's record may be set in accordance with the model of mobile device used by the customer. Here, if the user purchases an expensive or high end mobile station such as the Vertu Constellation, the quality service level may be placed at a given level, such as the highest service level. This may be done by comparing the make and/or model of the mobile station to a lookup table or other index to determine which service level should be employed.

As shown in step S106 FIG. 2, upon setting or updating the change in the quality of service level, the customer's billing record is set or updating to reflect the fee charged for the current level of service. The billing record may be part of the customer's general records or may be a separate record stored in a dedicated billing database or other database. Here, the process may terminate at step S108 or may return to step S104 for modification.

Figure 3:
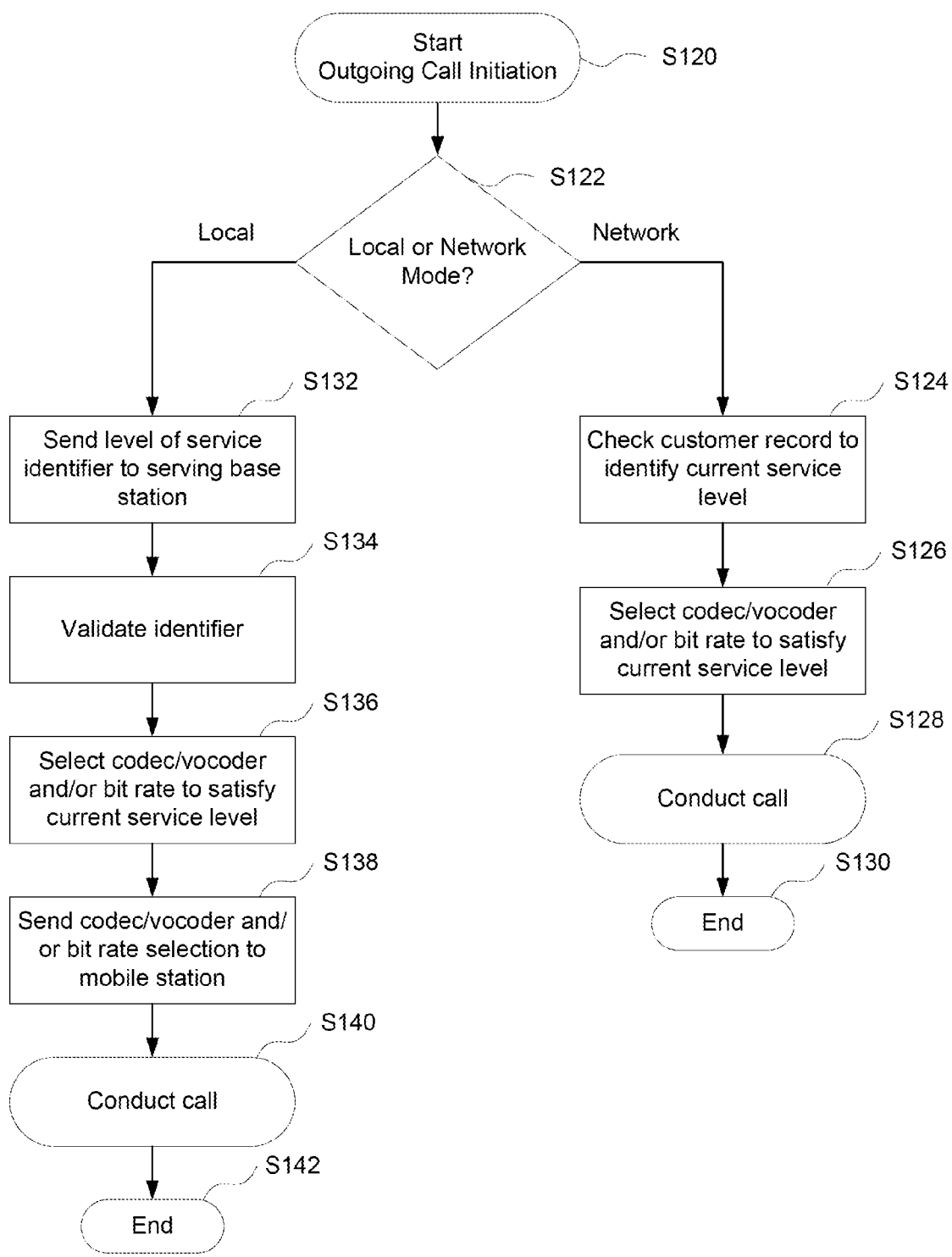
FIG. 3 illustrates an outgoing call process flow in accordance with aspects of the present invention.

Once the user's cellular phone or other mobile station is configured to operate on the service provider's network, he or she can make and receive calls or otherwise transmit/receive data. In accordance with an aspect of the present invention, FIG. 3 presents a flow diagram 120 illustrating an embodiment of how tiered servicing may be implemented when making outgoing calls. First, at step S120, an outgoing call is initiated on the user's mobile station. Step S122 shows that different modes are possible, such as a local mode and a network mode. The two modes will be addressed in detail below.

Turning first to the network mode case, the process continues at step S124. Here, after call initiation, a check is made of the customer's records to identify the current quality and/or security service levels. Then at step S126 the appropriate vocoder and/or bit rate are selected based upon the current quality and security service levels. Once the selection is made, the process may continue at step S128 where the user may conduct his or her call in accordance with the selection(s). Then the process may terminate at step S130.

Figure 4:
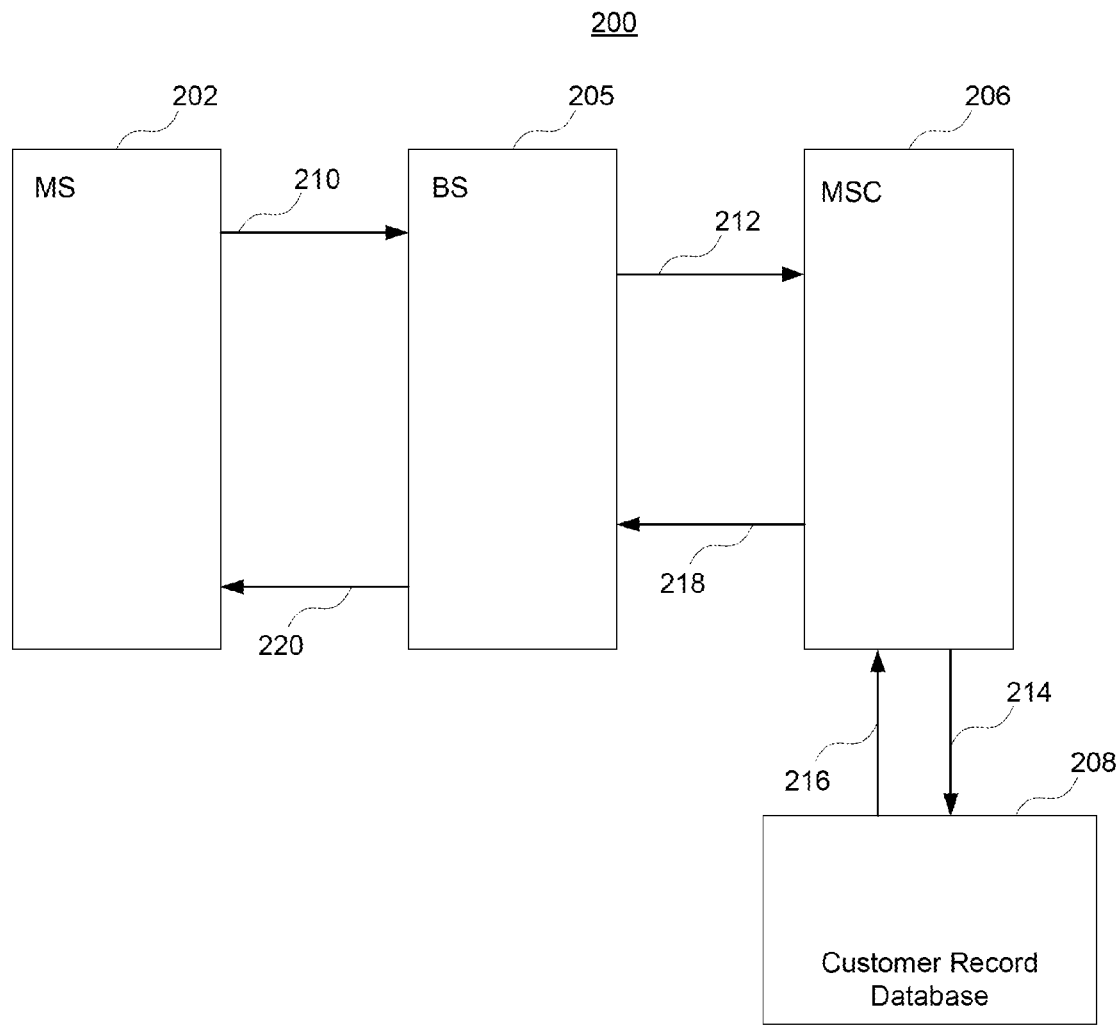
FIG. 4 illustrates a call flow scenario in accordance with aspects of the present invention.

In order to better describe one method of operation involving this network mode, reference is now made to FIG. 4. This figure presents a functional diagram 200 showing the user's mobile station 202, the serving base station 204, a mobile switching center 206 and the customer record database 208 used by a service provider. Other network elements are omitted for clarity.

In an example, the user's mobile station initiates a call by sending one or more signaling strings to the base station as shown by arrow 210. This signal flow may include a user device identifier therein. In this case, the user device identifier may be contained in a header or another particular place of such a string.

The base station may pass the user device identifier to the mobile switching center or other internetworking infrastructure as shown by arrow 212. The mobile switching center may then access a customer record database as shown by arrow 214. At this point the system is able to identify an appropriate quality/security service levels for the user's mobile device in accordance with the user's customer record, which corresponds to a subscriber's contract (SLA) with a service provider.

Then the customer record database passes information concerning the quality/security service levels back to the mobile switching center as shown by arrow 216. By way of example only, the information may be a value representing the quality/security service levels. In turn, the mobile switching center may then pass the service levels information back to the base station as indicated by arrow 218. The base station can thus select an appropriate vocoder for use (if more than one is available) and/or set a bit rate for the base station's vocoder. The vocoders of the base stations and the mobile stations may include an encryption device therein. Alternatively, the encryption devices may be distinct from the vocoders. See FIG. 18, which is discussed further below.

Finally, as shown by arrow 220, the base station may then send the mobile device its own identifier, which tells the mobile device which vocoder to use (if more than one is available) and/or which bit rate to set for the mobile station's vocoder. The base station may also send the mobile device information telling it which security level to select, with zero security level corresponding to basic service. In accordance with another aspect of the invention, the base station vocoder and the mobile station vocoder may be set to the same or different bit rates in view of the service level information.

In another example, when the user originates a call, data packets are sent from the mobile station to the base station as shown by the arrow 210. However, in this example no user device identifier is sent by the mobile station. Upon receipt of the data packets identifying a call origination, the base station communicates with the mobile switching center or other internetworking infrastructure as shown by the arrow 212. In turn, the mobile switching center may then access a customer record database as shown by the arrow 214.

Then as above, the customer record database looks up the user's record in the database and passes information concerning the quality/security service levels back to the mobile switching center as shown by the arrow 216. In turn, the mobile switching center may then pass this information back to the base station as indicated by the arrow 218. The base station can thus select an appropriate vocoder for use (if more than one is available) and/or set a bit rate for the base station's vocoder. Here, the corresponding security level may also be selected. Finally, as shown by the arrow 220, the base station may send the mobile device its own identifier, which tells the mobile device which vocoder to use (if more than one is available), which bit rate to set for the mobile station's vocoder, and/or which security level to select.

Thus, in these two network examples for mobile station call origination, it can be seen that the mobile station itself may send a user device identifier, which is passed to the customer record database or the infrastructure itself may check the database once the call is initiated.

Returning to step S122 of FIG. 3, when in local mode the process proceeds to step S132. Here, when the customer makes an outgoing call, the mobile station may send a user device identifier in one or more data packets to the serving base station. The user device identifier may include a quality level, security and/or bandwidth indicator. This may be done by placing the indicator in a packet header or in some other predefined data field in a given data packet.

Upon receipt of the indicator, the base station may validate the identifier as shown in step S134, for instance by comparing the identifier against a stored identifier in a database. The validation may be done locally at the base station or remotely by a mobile switching center, interworking function, customer record database or other network entity.

As shown in step S136, the base station may be operable to select the vocoder and/or set the bit rate to a quality level as indicated by the received identifier. It may also be operable to select the security level as indicated by the received identifier. This may be confirmed by sending a return indicator back to the mobile station as shown at step S138. Upon receipt of confirmation, the mobile station may then select the vocoder and/or set the bit rate to comply with the settings at the base station. As noted above, the base station vocoder and the mobile station vocoder may be set to different bit rates. The process proceeds to step S140, where the user can then conduct his/her call. The process may terminate at step S142.

Figure 5:
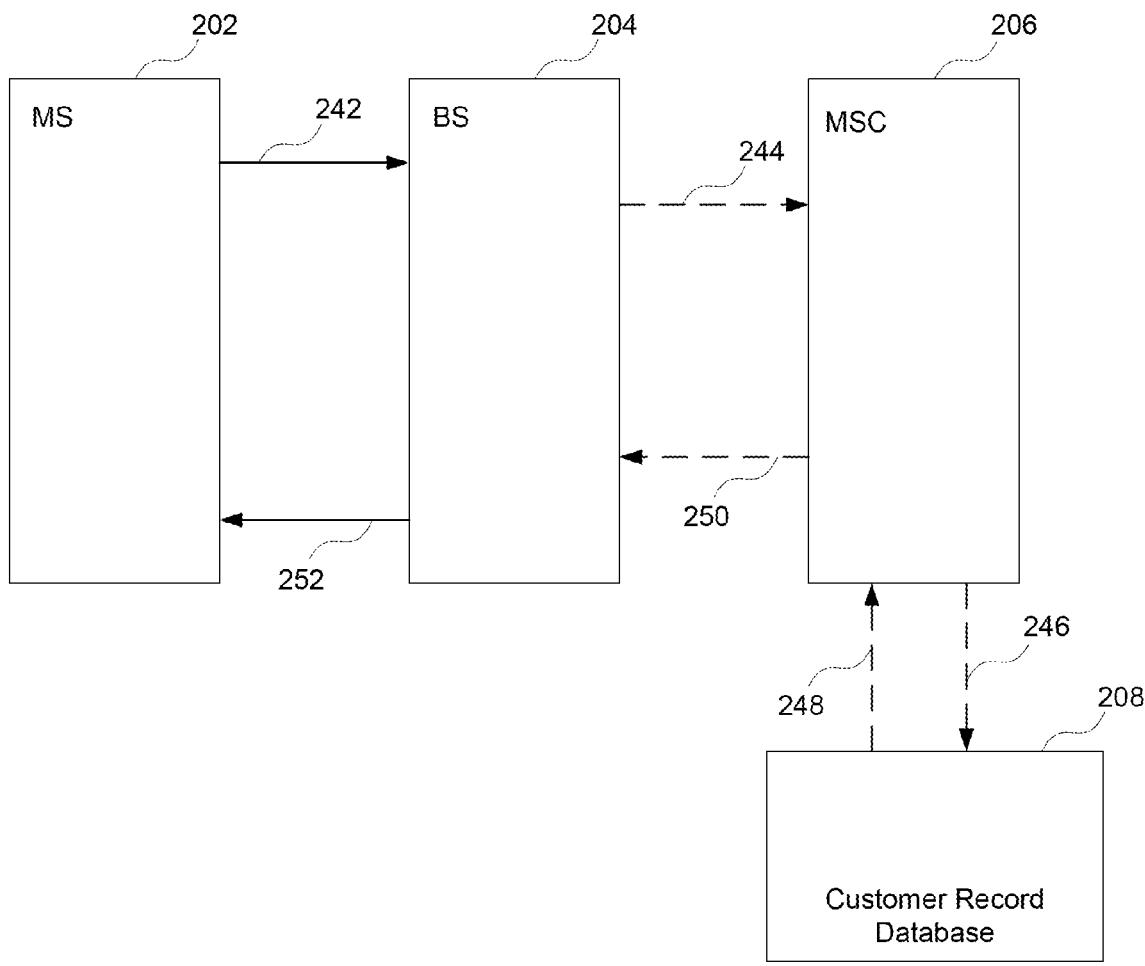
FIG. 5 illustrates another call flow scenario in accordance with aspects of the present invention.

In order to better describe one method of operation involving the local mode, reference is now made to FIG. 5. This figure presents a functional diagram 240 showing the user's mobile station 202, the serving base station 204, mobile switching center 206 and the customer record database 208. As with FIG. 4, other network elements are omitted for clarity.

In an example, the user's mobile station initiates a call by sending one or more data packets to the base station as shown by arrow 242. At least one of the data packets may include a user device identifier therein, e.g., in a header of the data packet. This identifier contains information on the Class of Service, which this particular subscriber purchased from the service provider. The base station may validate the identifier locally or may pass a validation request to the mobile switching center as shown by dashed arrow 244. If passed, the mobile switching center may process the validation request locally or may pass the request to other network resources such as the customer record database as shown by dashed arrow 246. A validation answer may be passed back from the database as shown by dashed arrow 248, and the validation answer may be passed from the mobile switching center to the base station as shown by dashed arrow 250.

Regardless of whether validation is performed locally by the base station or remotely, if the identifier is validated then the base station desirably selects an appropriate vocoder for use (if more than one is available) and/or set a bit rate for the base station's vocoder. The base station may also set up network characteristics as per selected Class of Service. Finally, as shown by the arrow 252, the base station may send the mobile station its own identifier, which tells the mobile device which vocoder to use (if more than one is available) and/or which bit rate to set for the mobile station's vocoder.

For any of the above examples, the indicator from the mobile station may include a request to use a particular vocoder, bit rate and/or bandwidth, as well to support transmission characteristics appropriate to the SLA purchased by this subscriber. In this case, the base station or other network element may determine the specific vocoder, bit rate and/or bandwidth in view of the indicator and the level of service purchased by the customer. The indicator may, by way of example only, specify different vocoders, bit rates and/or bandwidths, which the mobile station may support.

In another example, the indicator from the mobile station may specify a particular vocoder, bit rate and/or bandwidth that the base station is to use, as well as the transmission characteristics as per purchased SLA(s). Here, if the indicator is validated, then the specified vocoder, bit rate and/or bandwidth are used for wireless communication with the mobile station. Thus, a more expensive mobile station may instruct a serving base station to select the best available vocoder and/or bit rate to ensure the best sound quality of communication.

In yet another alternative, the indicator identifies the make and/or model of the mobile station. In this case, the base station or other network device may have a lookup table of supported mobile stations. An example of such a lookup table is provided in FIG. 6. Here six different mobile station models from various manufacturers are identified. For ease of understanding, only three tiers of service are provided, specifically a lowest tier, a middle tier and a highest tier. It should be understood that any number of service tiers may be provided. As shown in the figure, three of the models are assigned to the middle tier, one of the models is assigned to the lowest tier, and two of the models are assigned to the highest tier.

By way of example only, if a user initiates a call using a model associated with the lowest tier, the mobile station may be assigned to the lowest bit rate provided by the vocoder, e.g., on the order of 4.75 kbps, such as between about 4.5 kbps and 5.0 kbps. Mobile station models associated with the middle tier may be assigned a vocoder bit rate on the order of 7.75 kbps, such as between about 7.5 kbps and 8.0 kbps. And mobile station models associated with the highest tier may be assigned a vocoder rate on the order of 12.2 kbps, such as between about 11.9 kbps and 12.5 kbps. This creates significant benefits for service providers that can put more subscribers on the same bandwidth, or serve fewer subscribers, but with higher level of service.

In another example, the indicator from the mobile station may specify a particular security level that the base station is to use. Here, if the indicator is validated, then the specified security level is used for air communication with the mobile station. Thus, a mobile station may instruct a serving base station to select the security level, which this subscriber is entitled to have in accordance with the selected fee structure. The security level can be validated together with the quality of service layer, or may be validated separately from it. In any case, the structure of signal flow and functional elements may be the same as discussed above.

As discussed above, mobile stations will switch to different serving base stations depending upon the locations of the mobile stations relatively to BSs and other factors. Thus, in accordance with one aspect of the present invention, upon switching to a new serving base station, any of the initiation processes explained herein may be employed. Alternatively, during handoff the system may identify to the new serving base station, which tier of service the new serving base station is to accommodate the mobile station. This may be done via base station to base station communication, or upon direction from the mobile switching center or other network device as it communicates with the new serving base station. Such operation is desirable as it appears seamless to the mobile station.

Figure 7:
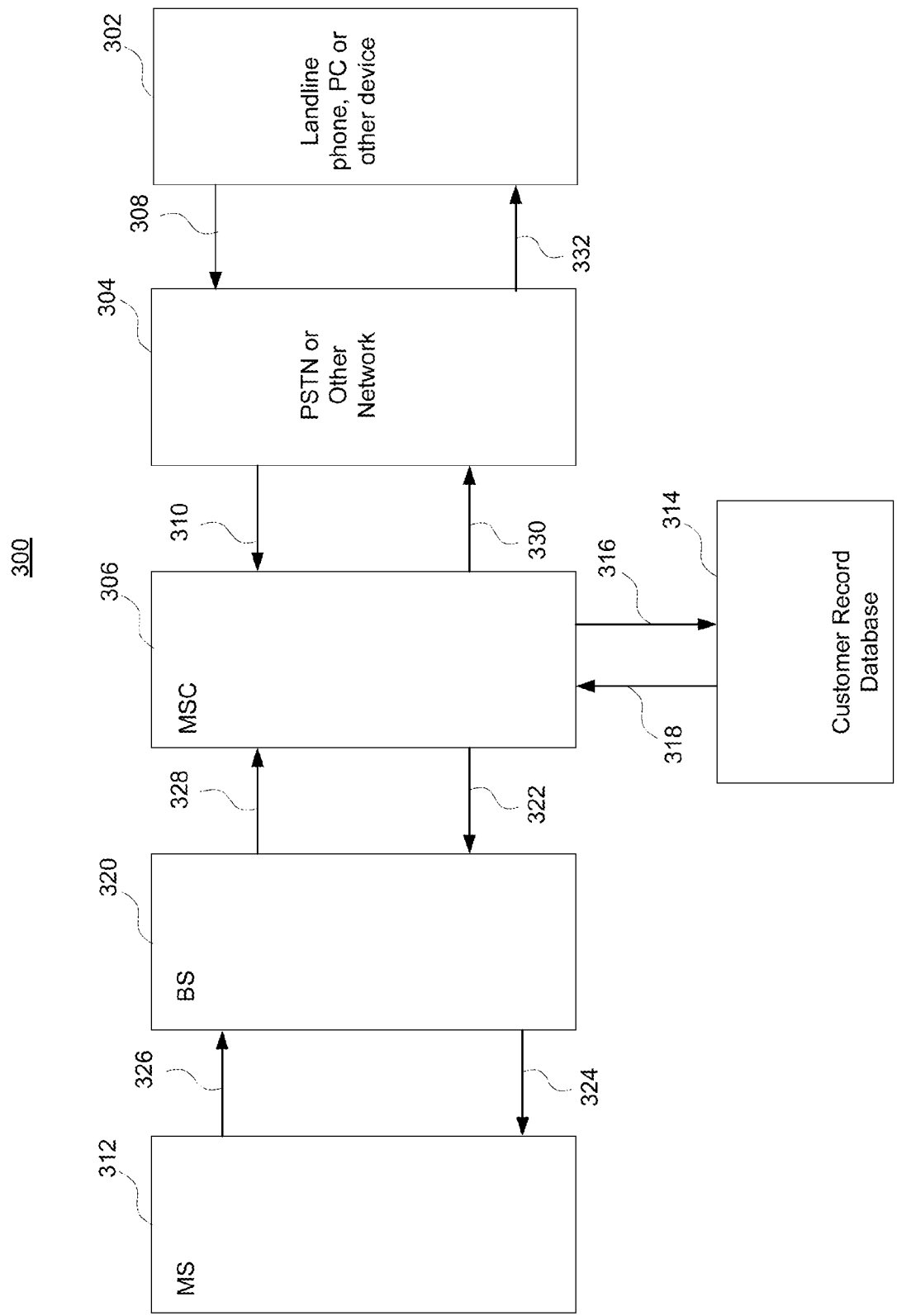
FIG. 7 illustrates an alternative call flow scenario in accordance with aspects of the present invention.

The above examples focused on calls initiated by the user's device. Another situation occurs when the user's device receives an incoming call or communication, which may come from another mobile station, a POTS telephone, a computer or the like. As shown in the scenario 300 of FIG. 7, an incoming call may be received from a landline phone or other communication device 302 and may pass through the PSTN or other network 304 to mobile switching center 306, as shown by arrows 308 and 310, respectively.

Upon receipt of an incoming call for a given mobile station, e.g., mobile station 312, the mobile switching center 306 or other wireless network entity may access customer record database 314 as shown by arrow 316. At the customer record database the mobile station's quality/security service levels are identified and a result is passed to the mobile switching center as shown by arrow 318. Next, the mobile switching center passes the incoming call along with the quality/security service levels for the call to base station 320 as shown by arrow 322.

The base station may set its vocoder and/or bit rate as well as identify a transmission path corresponding to the purchased service quality and security levels. The base station may then send one or more data packets to the mobile station as shown by arrow 324. At least one of these data packets includes a quality/security service levels identifier that the mobile station uses to set its vocoder and/or bit rate and security functions, e.g., as packet header information. Then communication between the mobile station and the landline or other device may take place as shown by arrows 326, 328, 330 and 332. The over the air communication between the mobile station and the base station occur using the set vocoder and/or bit rate in accordance with the mobile station's service/security levels.

In an alternative, the incoming call is routed from the landline telephone or other device to the mobile station, and once the mobile station receives an indication that a call has been initiated it sends a quality/security service levels request or identifier to the base station, for instance via a header, flag or other indicator in a data packet. As in the example of FIG. 4, the system may then validate the quality/security service level(s) identifier by evaluating the customer record database or by examining a lookup table as discussed in regard to FIG. 6.

In yet another embodiment, an incoming call may be received from another mobile station. An example of this situation is shown in the scenario 340 of FIG. 8, where an incoming call is received from mobile station 342 and pass through base station 344 (the serving base station of mobile station 342) to mobile switching center 346, as shown by arrows 348 and 370, respectively.

Upon receipt of an incoming call for the user's mobile station, e.g., mobile station 352, the mobile switching center 346 or other wireless network entity may access customer record database 354 as shown by arrow 356. At the customer record database the user's mobile station's quality/security service levels are identified and a result is passed to the mobile switching center as shown by arrow 358. Next, the mobile switching center passes the incoming call along with the quality/security service levels for the call to serving base station 360 of the mobile station 352 as shown by arrow 362.

The base station 360 may set its vocoder, bit rate and/or security level in accordance with the identified quality/security service levels. The base station 360 may then send one or more data packets to the mobile station 352 as shown by arrow 364. At least one of these data packets includes a quality/security service levels identifier that the mobile station 352 uses to set its vocoder and/or bit rate, e.g., as packet header information. Then, communication between the mobile station 352, shown as MS1 in FIG. 8, and the mobile station 342, shown as MS2 in FIG. 8, may take place as shown by arrows 366, 368, 370 and 372. The over the air communication between the mobile station 352 and the base station 360 occurs using the set vocoder, bit rate and/or security level(s), and selecting transmission facilities as per SLAs in accordance with that mobile station's service level.

In an alternative, the incoming call is routed from the mobile station 342 to the mobile station 352, and once the mobile station 352 receives an indication that a call has been initiated it sends a quality/security service levels request or identifier to the base station 360, for instance via a header, flag or other indicator in a data packet. As in the example of FIG. 4, the system may then validate the quality/security service levels identifier by evaluating the customer record database or by examining a lookup table as discussed in regard to FIG. 6.

Figure 8:
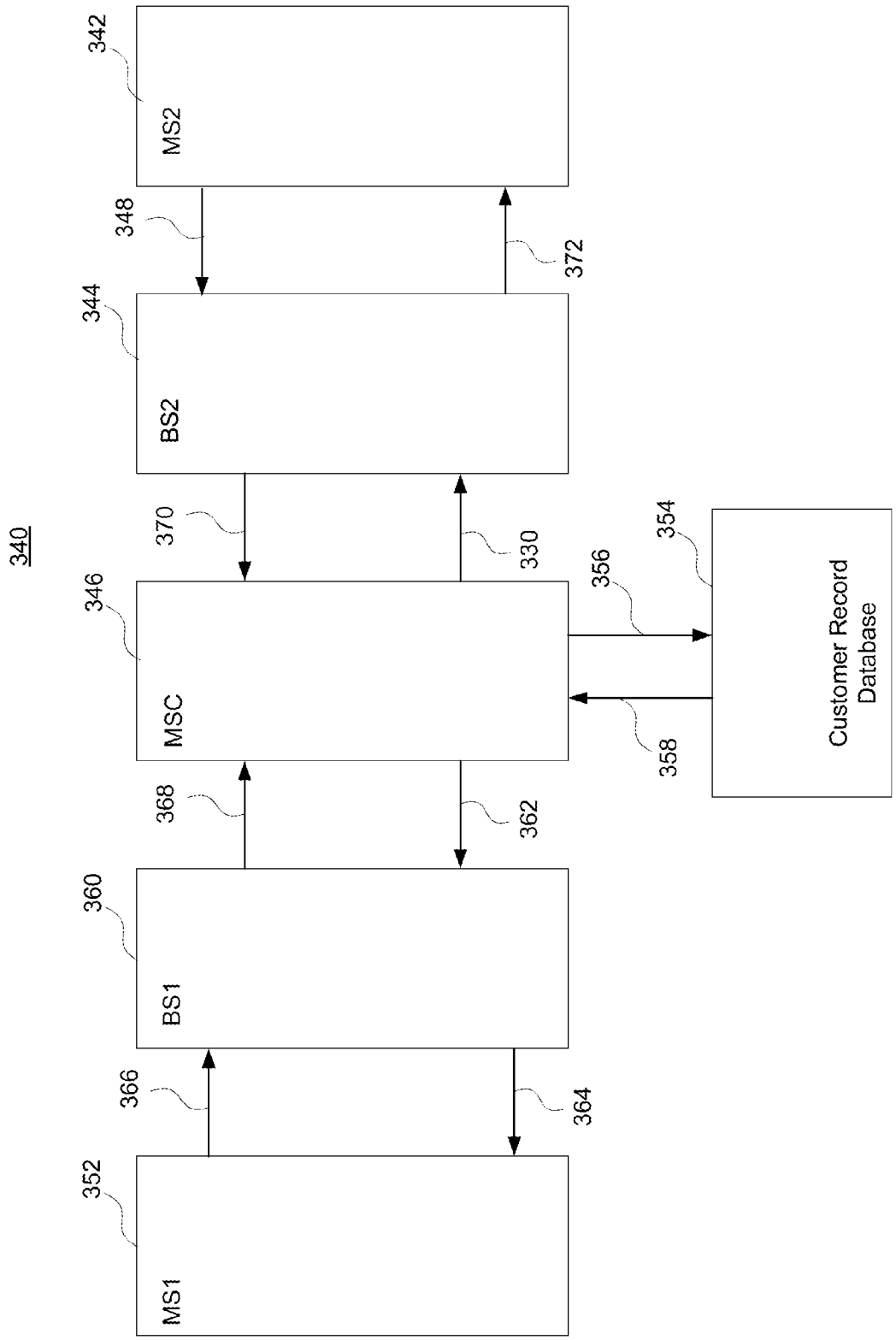
FIG. 8 illustrates a further call flow scenario in accordance with aspects of the present invention.

In another example, it should be understood that both mobile stations, e.g., MS1 and MS2 in FIG. 8, may have quality/security service levels set in accordance with FIG. 2 above. These service levels may be the same or may differ. Should the service levels differ, several options are available. In accordance with an embodiment of the invention, when the receiving mobile station has a higher quality/security service levels (e.g., a higher bit rate for its vocoder), then the receiving mobile station issues an instruction to the originating mobile station to have the originating mobile station switch to a matching quality/security service levels (if this is possible).

This may be done at the expense of the originating mobile station, or the service provider may bear the expense.

In the situation where the originating mobile station has the higher quality/security service levels, it may instruct the receiving mobile station (e.g., via a data packet header, flag or other identifier) to operate at the higher quality/security service levels (if this is possible). And as above, this may be done at the expense of the originating mobile station or the service provider may bear the expense.

In such a situation where the two mobile stations are arranged to operate at the same voice quality or service level, as well as at the same security level, it may be desirable that the serving base stations are set to equivalent or corresponding voice quality or service levels as well as the security level. For instance, the serving base stations may each be set to the same vocoder bit rate. And it should be understood that a single base station may act as the serving base station for both of the mobile stations. Furthermore, more than two mobile stations may all be communicating simultaneously as part of a three-way or conference call. In this situation, the mobile station with the highest service level may dictate the service level of one or more of the other communicating mobile stations.

And in another alternative, MS2 sends a request to MS1 (through base stations BS1 and BS2 and with the help of MSC) to communicate. As an example only, the mobile stations may be registered with different quality/security service levels. For example, the MS2 user may have bought only a basic level of service and the MS1 user may have bought the highest level of quality/security service. BS1 and BS2 recognize such a fact. The called party associated with BS1 and the calling party associated with BS2 may have the ability to set-up a communications channel between two entities, MS1 and MS2 (see FIG. 8). As soon as the BS closest to the MS1 base station (BS1 in FIG. 8) recognizes that the two parties have different bit coding rates, it terminates the line, and makes real-time recording of all data coming from MS2 and re-decoding analog streams in a way acceptable to MS1, i.e., with the vocoder settings of MS1. At the other side of the link, BS2 (which is the closest BS to MS2 at this particular time) terminates traffic flow from MS1, and re-decodes the person's voice as per MS2 settings. In this way, both mobile stations communicate with each other without violations of service agreements with a provider (except at the span between a MS and the closest BS).

In a further alternative, a service provider(s) creates "closed" groups of subscribers. Here, each group is differentiated by quality/security service level agreements. For example, the premium services customers want to receive and transmit information as per their contract with a service provider with arranged SLAs. This contract may require that service provider needs to select the best facilities (for example, fiber optics channels with dual rings architecture to guarantee high-quality transmission and reception). Identifications of subscribers' service and security levels for each closed group may be performed as described above. If a subscriber from the "closed" group with a lower service grade wants to communicate with a subscriber from a higher level of service group, then he/she may pay a premium for the duration of the call. If a subscriber belongs to a closed group with a higher level of service, and he/she wants to talk with a subscriber, which belongs to a closed group with a lower service grade, then the premium may be paid again by the lower service grade subscriber (similar to the current rules in the U.S. when a subscriber pays for both incoming and outgoing calls).

Figure 9:
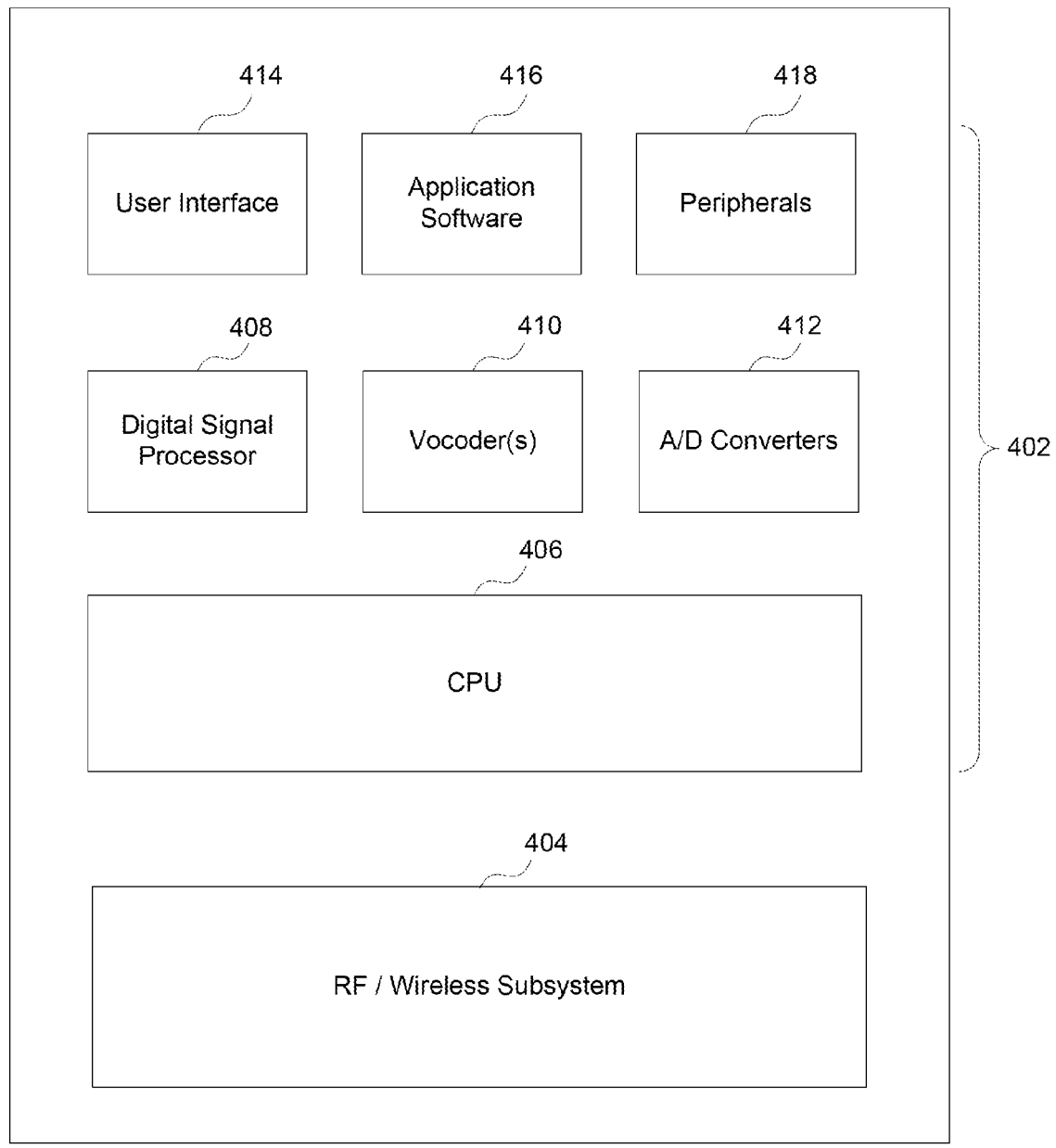
FIG. 9 provides a mobile station architecture in accordance with aspects of the present invention.

FIG. 9 illustrates a mobile station 400 for use in accordance with aspects of the present invention. As shown, the mobile station 400 may include a baseband subsystem 402 and an RF or wireless subsystem 404. Both the baseband and RF subsystems may be controlled by a processor such as CPU 406. As used herein, the term RF encompasses, but is not limited to the signals in the frequency range from 300 MHz up to 3 GHz. This range is often referred to as the ultra high frequency band ("UHF"). By way of example only, RF may encompass signals of lower frequency ranges such as a very high frequency ("VHF") from 30 MHz to 300 MHz or even lower, such as in the high frequency ("HF") band. RF may also encompass signals of higher frequency ranges such as super high frequency ("SHF") from about 3 GHz up to 30 GHz or beyond, such as extremely high frequency ("EHF") in the range of 30 GHz to 300 GHz or higher.

The RF subsystem preferably includes a receiver and a transmitter ("transceiver") coupled to an antenna (not shown). Details on RF subsystem architectures may be found in "Transceiver System Design for Digital Communications," by Scott R. Bullock, copyright 1995 by Noble Publishing, the entire disclosure of which are hereby expressly incorporated by reference herein.

By way of example only, the baseband subsystem may include a digital signal processor ("DSP") 408, one or more vocoders 410, A/D (Analog/Digital) converters 412, a user interface 414, application software 416 and peripherals 418. The DSP may perform various signal processing tasks, and the vocoder(s) may be separate from or part of the DSP. In one example, the DSP is part of the processor 406 and/or may perform operations of the processor 406. Multiple vocoders may be desirable, especially in the situation where the mobile station is configured to operate on different carriers' networks such as a WCDMA network and a GSM network. Each vocoder may support multiple bit rates. The user interface may include a text interface, a GUI, actuators such as switches, buttons and the like. The application software may be configured to run/control various programs on the mobile station, such as a calendar program, a contacts program, games, an Internet browser, etc. Different peripherals may also be employed, such as an external audio output, microphone input, a charging connector and connectors for other electronic devices, such as a USB connector.

In accordance with a further aspect of the invention, before or during a call the user may press an actuator or "soft button" of the user interface to cause the mobile station to instruct the base station/network to use a particular compression level (e.g., a specific bit rate) and/or to use a particular vocoder or bandwidth. This may be done in conjunction with application software to set the call quality. Then, as above, the quality information is used to set the bit rate, vocoder and/or bandwidth during communication with a recipient.

If the recipient is another mobile station, the caller may use the actuator or the soft button to instruct the receiving mobile station and/or the network to switch the receiving mobile station to the same quality service level and security level as the calling mobile station. This will help to ensure that both parties are sending and receiving at the same quality/security levels.

In accordance with yet another aspect of the present invention, if for some reason the network fails to utilize the specified vocoder, bit rate, bandwidth, other transmission parameters that identify Class of Service and/or the security level for the duration of a call or transmission, the user who is supposed to receive the specified quality/security levels may be financially compensated for such a failure. For instance, the customer's billing record may be credited a full or partial amount of what the call or transmission would have been charged to the customer. Furthermore, metrics may be provided to customers showing the quality/security levels for incoming and outgoing calls. Such metrics may be appended to the user's billing records, available through a web-based GUI or the like.

Figure 10:
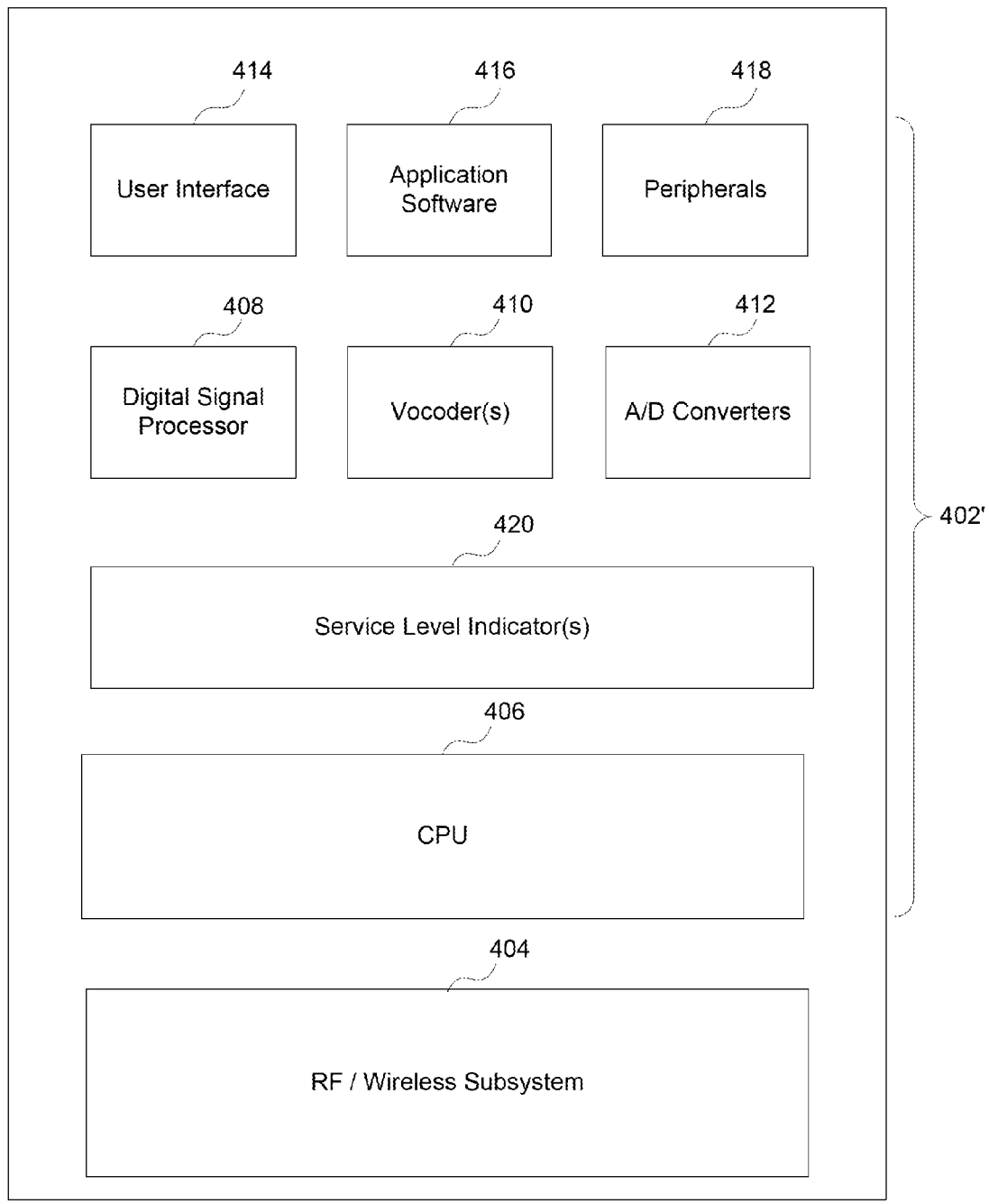
FIG. 10 provides an alternative mobile station architecture in accordance with aspects of the present invention.

In accordance with another aspect of the present invention, FIG. 10 illustrates a variation of the mobile station 400, namely mobile station 400'. As shown, the mobile station 400' includes a baseband subsystem 402' as well as the RF or wireless subsystem 404. Both the baseband and RF subsystems may be controlled by a processor such as CPU 406.

Many of the components of the mobile station 400' are the same as those in the mobile station 400 and operate as described above. As shown in FIG. 10, the mobile station 400' includes one or more quality/security service levels indicators 420, which may be hard programmed into the mobile station 400'. In one example, this may be done by programming the quality/security service levels indicators 420 into firmware of the baseband subsystem 402' when the phone is purchased by a customer. In another example, the programming may be accomplished by recording the quality/security service levels indicators 420' in a nonvolatile memory such as a ROM during manufacture of the mobile station 400'. In a further example, the quality/security service levels indicator(s) are hard programmed onto a subscriber identity module ("SIM") card, which can be received through one of the peripherals 418.

Figure 11:
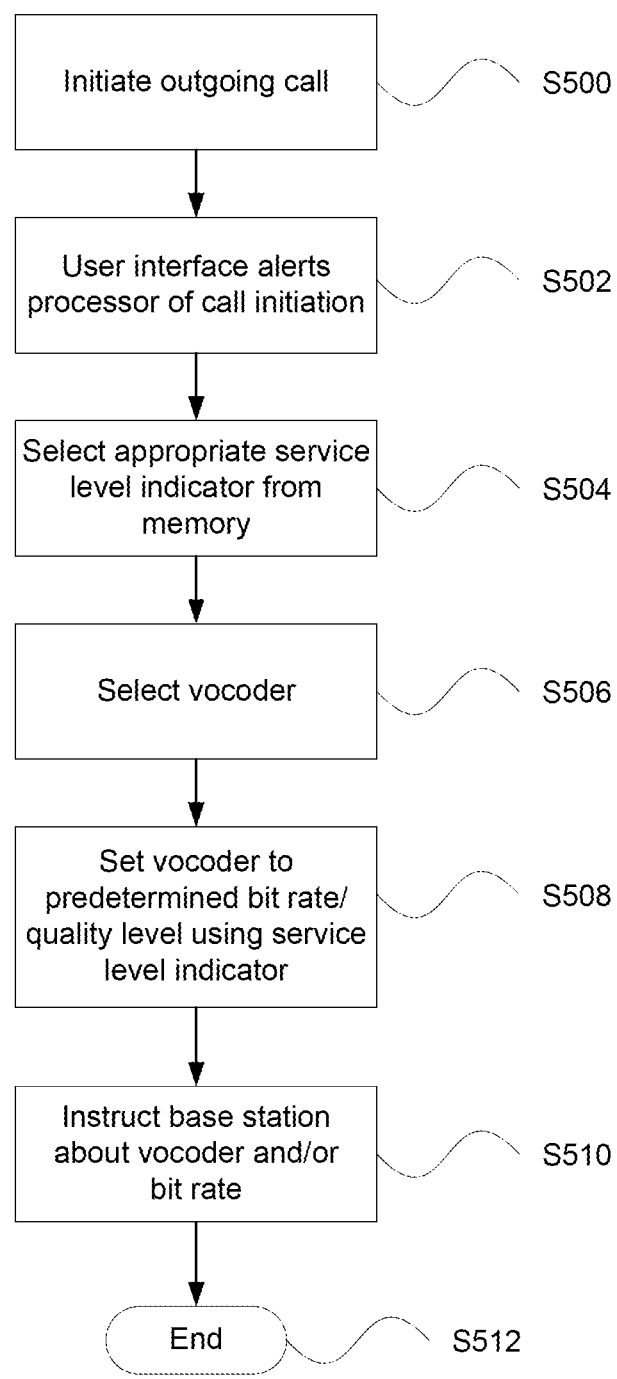
FIG. 11 illustrates an alternative outgoing call flow scenario in accordance with aspects of the present invention.

Regardless of how the quality/security service levels indicator(s) 420 is/are hard programmed into the mobile station 400', a given quality/security service level(s) indicator(s) may be utilized as follows. As shown in the flow diagram 500 of FIG. 11, in the case where a user of the mobile station 400' initiates an outgoing call, the user interface 414 may receive a command from the user to begin a call as shown in step S500. Next, as shown at step S502, the user interface 414 may alert the CPU 406 that a call has been initiated. Then as shown in step S504, the CPU 406 may read the appropriate quality/security service levels indicator 420 from memory, e.g., from non-volatile or permanent memory. The quality/security service levels indicator 420 may be selected depending upon the particular network on which the mobile station 400' is currently operating.

As shown in step S506 only as an example, the CPU 406 may select a specific vocoder 410 to use if more than one vocoder is available. And as shown in step S508, the CPU 406 may set the vocoder to a predetermined bit rate or quality level based upon the service level indicator 420 employed. Next, as shown in step S510, the mobile station 400' may communicate with the current service base station and instruct the base station as to what vocoder and/or bit rate the mobile station will employ during the call. The process may conclude at step S512.

Figure 12:
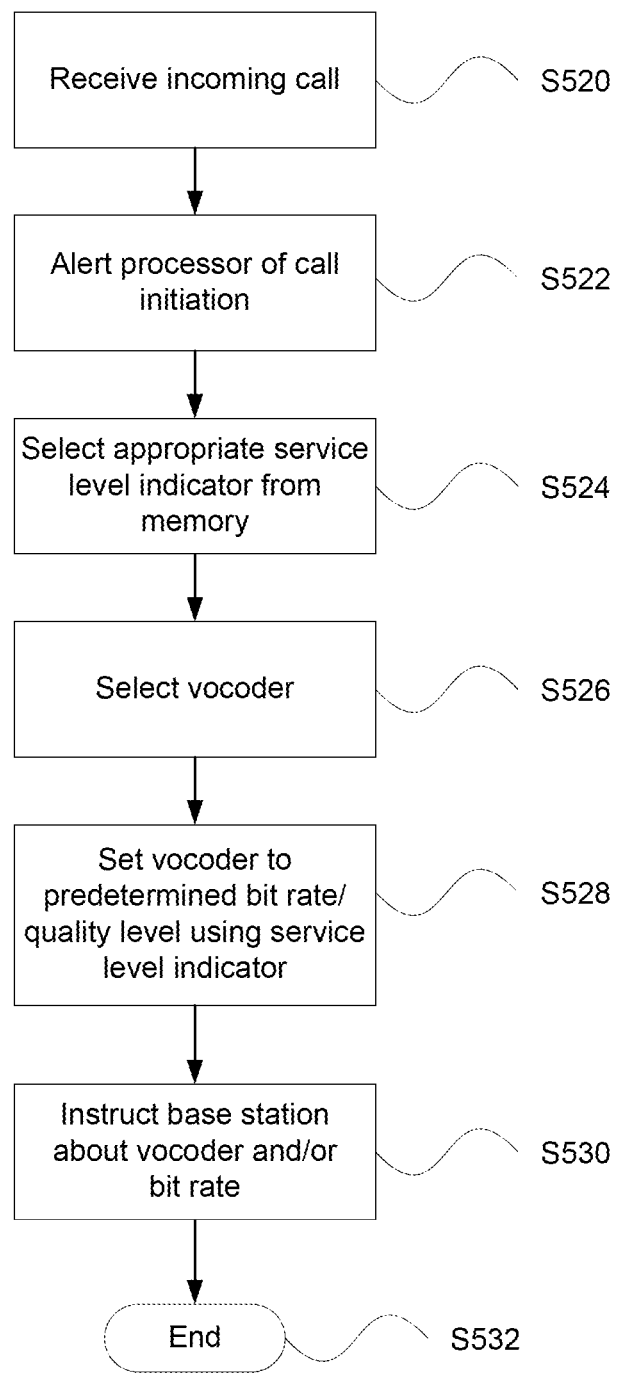
FIG. 12 illustrates an alternative incoming call flow scenario in accordance with aspects of the present invention.

A similar process may occur when the mobile station receives an incoming call. In one example shown in the flow diagram 520 of FIG. 12, in the case where a user of the mobile station 400' receives an incoming call, the RF/wireless subsystem 404 may receive notification of an incoming call from a serving base station as shown in step S520. As shown at step S522, the CPU 406 may be alerted that a call has been initiated. Then as shown in step S524, the CPU 406 may read the appropriate quality/security service level indicator 420 from memory, e.g., from non-volatile or permanent memory. The quality/security service levels indicator 420 may be selected depending upon the particular network on which the mobile station 400' is currently operating.

As shown in step S526 only as an example, the CPU 406 may select a specific vocoder 410 to use if more than one vocoder is available. And as shown in step S528, the CPU 406 may set the vocoder to a predetermined bit rate or quality level based upon the service level indicator 420 employed. As shown in step S530, the mobile station 400' may communicate with the current service base station and instruct the base station as to what vocoder and/or bit rate the mobile station will employ during the call. The process may conclude at step S532.

Figure 13:
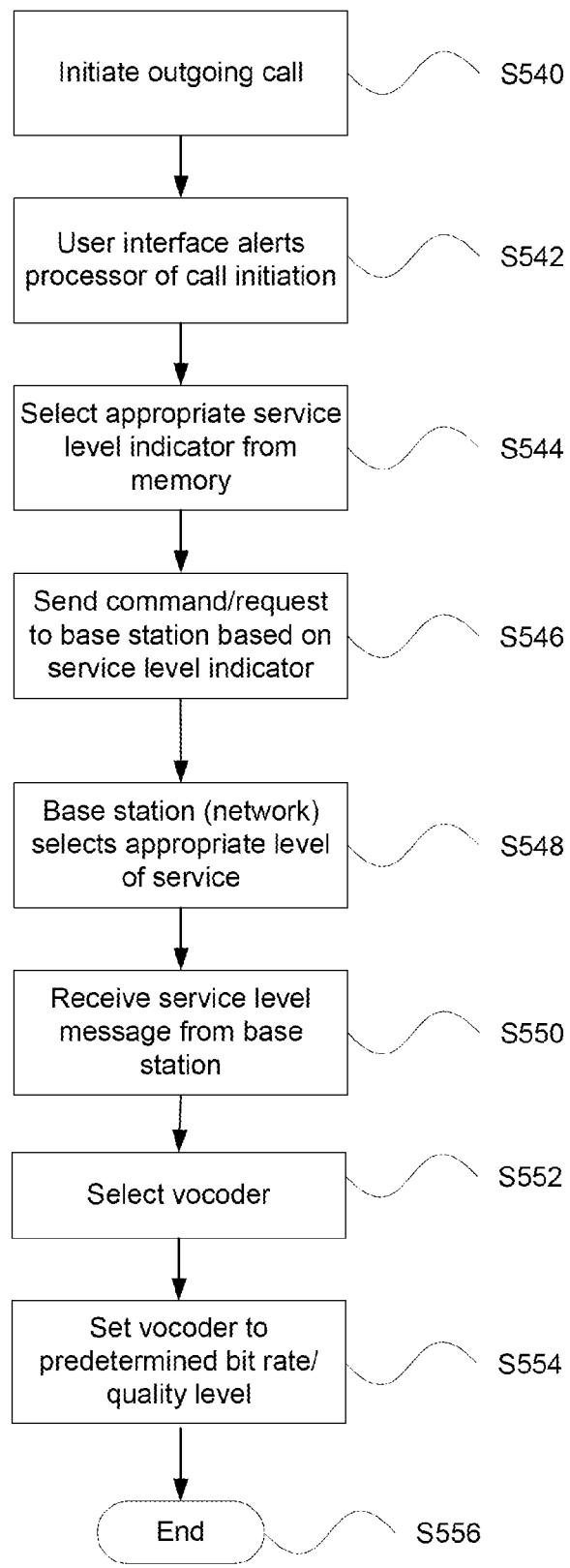
FIG. 13 illustrates another outgoing call flow scenario in accordance with aspects of the present invention.

Alternative procedures may be employed when initiating or receiving calls with the mobile station 400'. For instance, as shown in the flow diagram 540 of FIG. 13, in the case where a user of the mobile station 400' initiates an outgoing call, the user interface 414 may receive a command from the user to begin a call as shown in step S540. Next, as shown at step S542, the user interface 414 may alert the CPU 406 that a call has been initiated. Then as shown in step S544, the CPU 406 may read the appropriate quality/security service levels indicator 420 from memory, e.g., from non-volatile or permanent memory. The quality/security service level indicator 420 may be selected depending upon the particular network on which the mobile station 400' is currently operating.

Then, as shown in step S546, the quality/security service levels indicator may be used to send a command or request to the base station or other network element to select an appropriate levels of service. The base station or other network element (e.g., MSC) may then select an appropriate quality/security service level in view of the quality/security service level indicator information received from the mobile station 400', as shown at step S548. Then as shown at step S550, the mobile station 400' receives a service level message from the base station.

Based upon the received quality/security service levels message, the baseband subsystem 402' (e.g., CPU 406) may select a specific vocoder 410 to use if more than one vocoder is available, as shown at step S552. And as shown in step S554, the CPU 406 may set the vocoder to a predetermined bit rate or quality level based upon the service level indicator 420 employed. The process may conclude at step S556.

Figure 14:
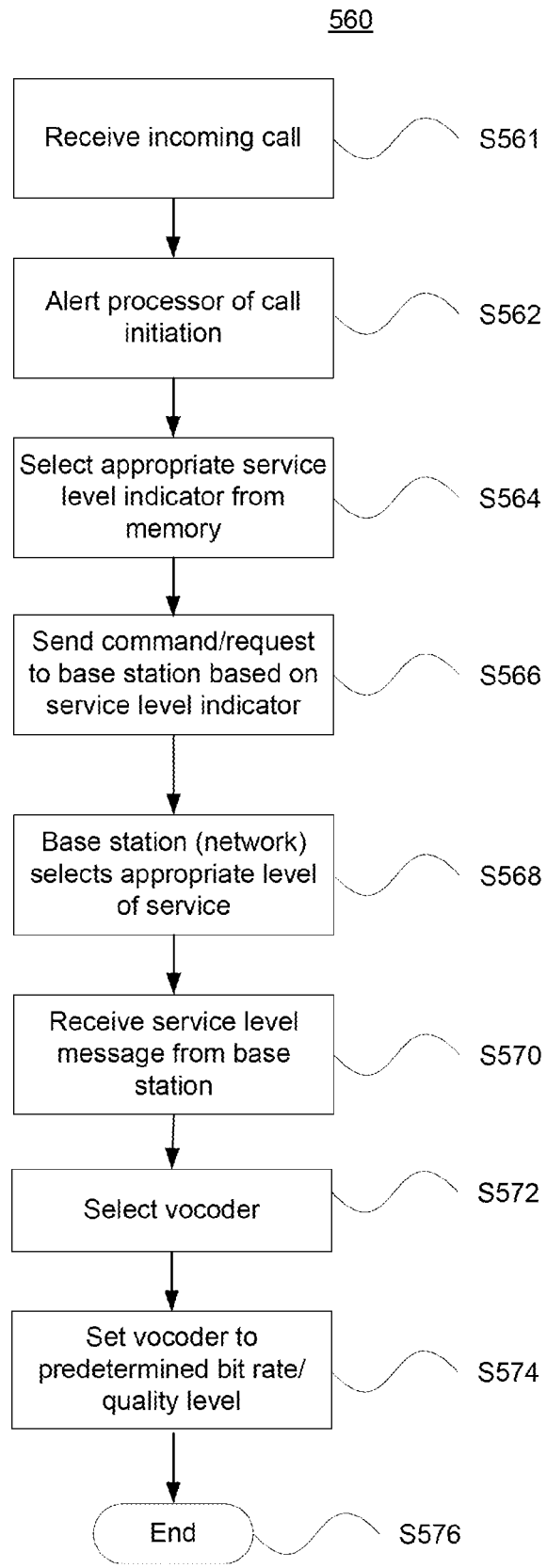
FIG. 14 illustrates an alternative incoming call flow scenario in accordance with aspects of the present invention.

A similar process may occur when the mobile station receives an incoming call. In one example shown in the flow diagram 560 of FIG. 14, in the case where a user of the mobile station 400' receives an incoming call at step 561, the RF/wireless subsystem 404 may receive notification of an incoming call from a serving base station as shown in step S560. As shown at step S562, the CPU 406 may be alerted that a call has been initiated. Then as shown in step S564, the CPU 406 may read the appropriate quality/security service levels indicator 420 from memory, e.g., from non-volatile or permanent memory. The quality/security service levels indicator 420 may be selected depending upon the particular network on which the mobile station 400' is currently operating.

Then, as shown in step S566, the quality/security service level indicator(s) may be used to send a command or request to the base station or other network element to select an appropriate quality/security levels of service. The base station or other network element (e.g., MSC) may then select an appropriate quality/security service levels in view of the quality/security service level indicator information received from the mobile station 400', as shown at step S568. Then as shown at step S570, the mobile station 400' receives a quality/security service levels message from the base station.

Based upon the received quality/security service levels message, the baseband subsystem 402' (e.g., CPU 406) may select a specific vocoder 410 to use if more than one vocoder is available, as shown at step S572. And as shown in step S574, the CPU 406 may set the vocoder to a predetermined bit rate or quality level based upon the service level indicator 420 employed. The process may conclude at step S576.

It should also be understood as described elsewhere herein, that in the case when the incoming call is from another mobile device or any user device in which the bit rate or vocoder may be set, the caller's device may have it's bit rate/vocoder set commensurate with that of the user device 400'. This may be done, for example, to ensure consistent voice quality between the parties on the call.

Figure 15:
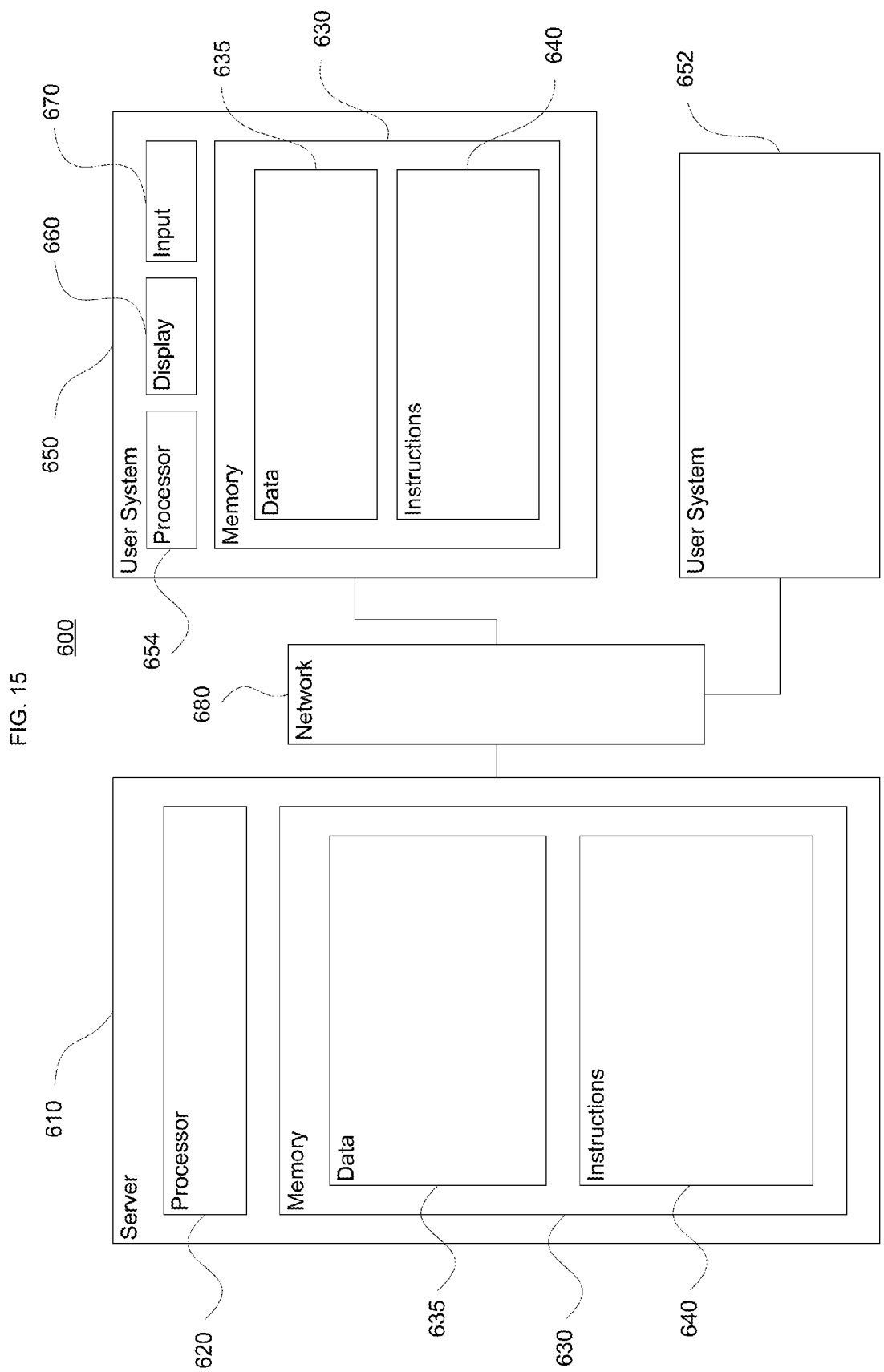
FIG. 15 illustrates a communication system in accordance with aspects of the present invention.

As discussed above, the user may set or change the quality/security service level(s) for one or more devices using a web-based interface. FIG. 15 provides an exemplary system 600 in which a user may view and/or modify quality/security service levels over a network.

For example, the system 600 may include a server 610 containing a processor 620, memory 630 and other components typically present in a computer. The server may be associated with a particular wireless communication network, in which case it may be in operative communication with or operatively coupled to the MTSO or MSC. The memory 630 stores information accessible by processor 620, including instructions 640 that may be executed by the processor 620 and data 635 that may be retrieved, manipulated or stored by the processor. The memory 630 may be of any type capable of storing information accessible by the processor, such as a hard-drive, ROM, RAM, CD-ROM, write-capable or read-only memories.

The processor 620 may comprise any number of well known processors, such as processors from Intel Corporation. Alternatively, the processor may be a dedicated controller for executing operations, such as an ASIC. The instructions 640 may comprise any set of instructions to be executed directly (such as machine code) or indirectly (such as scripts) by the processor. In that regard, the terms "instructions," "steps" and "programs" may be used interchangeably herein. The instructions may be stored in any computer language or format, such as in object code or modules of source code. The quality service level information may be a short code that indicates which quality class of service is purchased by a subscriber. The security level may be coded together with signal quality information, or may be a separate code. The functions, methods and routines of instructions in accordance with the present invention are explained in more detail below.

Data 635 may be retrieved, stored or modified by processor 620 in accordance with the instructions 640. The data may be stored as a collection of data. For instance, although the invention is not limited by any particular data structure, the data may be stored in computer registers, in a relational database as a table having a plurality of different fields and records, XML documents, or flat files. The data may also be formatted in any computer readable format Moreover, the data may include any information sufficient to identify the relevant information, such as descriptive text, proprietary codes, pointers, references to data stored in other memories (including other network locations) or information which is used by a function to calculate the relevant data.

Although the processor 620 and memory 630 are functionally illustrated in FIG. 15 as being within the same block, it should be understood that the processor 620 and memory 630 may comprise multiple processors and memories that may or may not be stored within the same physical housing or location. For example, some or all of the instructions and data may be stored on a removable CD-ROM and others within a read-only computer chip. Some or all of the instructions and data may be stored in a location physically remote from, yet still accessible by, the processor. Similarly, the processor may actually comprise a collection of processors, which may or may not operate in parallel.

In one aspect of the present invention, server 610 communicates with one or more client computers 650 and 652. Each client computer may be configured similarly to the server 610, with a processor 654, memory and instructions, as well as a user input device 670 and a user output device, such as display 660. Each client computer may be a general purpose computer, intended for use by a person and having all the internal components normally found in a personal computer such as the processor 654 (e.g., a CPU), display 660, CD-ROM, hard-drive, mouse, keyboard, touch-sensitive screen, speakers, microphone, modem and/or router (telephone, cable or otherwise) and all of the components used for connecting these elements to one another.

The server 610 and client computers 650 are capable of direct and indirect communication with other computers, such as over a network 680. Although only a few computers are depicted in FIG. 15, it should be appreciated that a typical system can include a large number of connected servers and clients, with each different computer being at a different node of the network. The network 680, and intervening nodes, may comprise various configurations and utilize various protocols and communications channels including the Internet, intranets, virtual private networks, wide area networks, local networks, private networks using communication protocols proprietary to one or more companies, Ethernet, WiFi and HTTP.

Communication may be facilitated by any device capable of transmitting data to and from other computers, such as modems (e.g., dial-up or cable), network interfaces and wireless interfaces. Server 610 may be a web server. Although certain advantages are obtained when information is transmitted or received as noted above, other aspects of the invention are not limited to any particular manner of transmission of information. For example, in some aspects, the information may be sent via a medium such as a disk, tape, CD-ROM, or directly between two computer systems via a dial-up modem. In other aspects, the information may be transmitted in a non-electronic format and manually entered into the system.

In the case where the user of one of the client computers is a customer accessing his/her account records, the system 600 may be an Internet or web-based system. The user may set or change the quality/security service level(s) of one or more devices using system 600. For instance, the server 610 may provide a GUI to the user with an option to select from among a plurality of quality/security service levels for a given user device. Once a selection has been made, the user's customer record may be updated to reflect the selection. A customer record database may be part of memory 635, and may be accessible, either directly or indirectly, from the network's base stations, MSC or other network infrastructure. Here, the user may access the GUI using his/her own computer or through a computer provided by the service provider, such as at a kiosk or at one of the service provider's stores.

In another example, the user may be a reseller or aggregator who may pre-set service levels into various mobile stations using either a client computer or the server 610 directly. Here, by way of example only, the customer record database may be stored locally with the server 610 with access provided to the network provider(s) or the customer record database may be maintained by a network provider with access provided to the reseller or aggregator.

In yet another example, the user may be a mobile station manufacturer who may pre-set service levels into various mobile stations using either a client computer or the server 610 directly. This may be done, as discussed above, by hard wiring the service level(s) into the mobile station during production.

In an adaptive level service, the user may start, as predetermined by means of programming, with the lowest service level. The transcoder may have a threshold device, which analyzes one or several parameters of the received signal. The thresholds may be correlated with quality/security service levels. As soon as the transceiver extracts information that shows the received signal degradation, the threshold device asks the MS to switch to the next higher service layer. This process may continue until the communications channel is within satisfactory conditions (or until the subscriber has exhausted all possible quality/security levels he/she was entitled.)

In accordance with further aspects of the present invention, another embodiment addresses a situation where a customer who has purchased a premium tier of assured quality communicates with another person who may or may not subscribe to the premium tier. In the case where both users have the same premium service, a voice call may be carried out between them by setting the system as described above. For instance, the incoming/outgoing call is set at the premium tier of service for the receiving party/calling party using any of the processes herein.

In a situation where the other person does not subscribe to a premium tier, one option is to conduct a call with the first party operating with the premium tier while the other party operates at a lower tier of service. However, in many situations this may be undesirable, as the call quality received by the premium tier customer will be substandard.

Thus, in one alternative, when a call is made to/from a premium tier mobile station and the other party's mobile station has a lower tier of service, the other party may receive an upgrade in service for the duration of the call to match the premium tier of the other mobile station. This may be done automatically or manually.

For instance, in an automatic mode of operation a network device, such as a serving base station of the non-premium tier mobile station, may receive an indication that the other mobile station is a premium tier device. Here, the serving base station of the non-premium tier mobile station may automatically choose a higher quality vocoder, greater bandwidth, etc. for the non-premium tier mobile station in order to ensure end to end high quality communication between the two mobile stations. Thus, even though the non-premium tier mobile station would not normally operate in a premium tier mode, it may be "forced" or "upgraded" into such a tier as long as it is capable of supporting that mode of operation (e.g., supports the premium tier vocoder).

In one alternative, this type of upgrading may be available under a "premium plus" type of plan, wherein the subscriber to the premium tier may be given the additional option of upgrading calling/called parties. This may be done for an additional charge, which may be billed via the subscriber's customer record. The premium plus service may have a flat rate charge, such as a monthly fee charged whether or not any upgrades are made. Alternatively, the subscriber may be charged on a "pay as you go" program where he or she is billed the premium plus fee only when the other party is actually upgraded.

In another alternative, the subscribers who are not matched by quality of service may communicate according to their service subscription until the signal reaches the closest BS to a subscriber BS. Such a BS then terminates data streams and re-records and transmits them at an appropriate bandwidth and a bit rate for the corresponded subscriber.

In still another alternative, subscribers may be united by purchased grade classes of services (quality or/and security). In this way, they organize the closed groups of subscribers, and can talk to each other, as was described above, inside of the group. If a subscriber from a "lower" group wants to talk to a subscriber from a "higher" level group, then, as per a contract, he/she needs to pay a premium for the duration of such a call. The same situation is valid when a subscriber from a "lower" group receives a call from a subscriber that belongs to a "higher" level group, a network instructs a lower grade subscriber to use transmission that guarantees a higher group quality of service. Note that groups are supposed to be compatible, i.e., mobile stations should have the ability to be adjusted to the same transmission characteristics.

Figure 16:
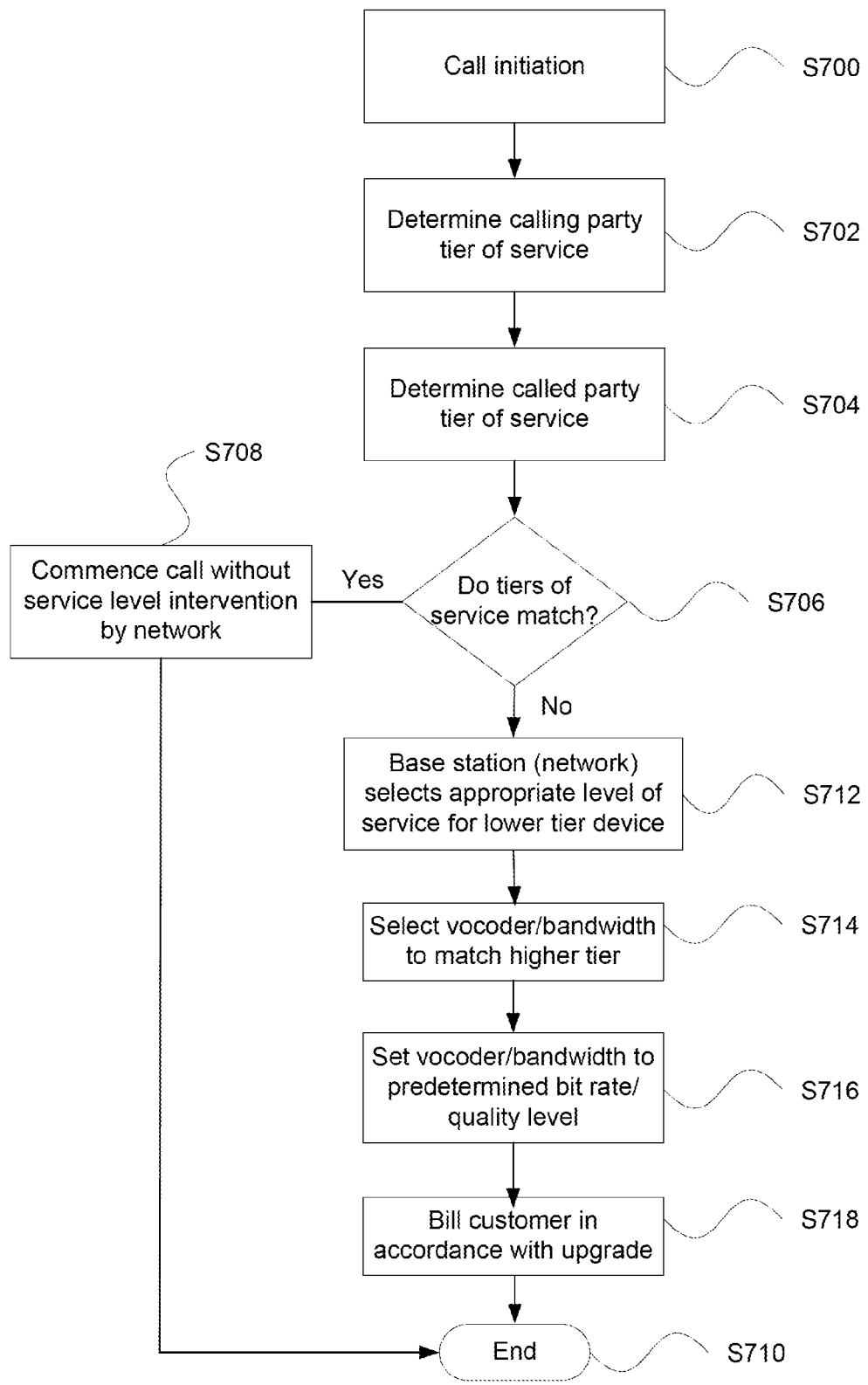
FIG. 16 is a flow diagram illustrating a first upgrade operation in accordance with aspects of the present invention.

FIG. 16 illustrates an exemplary call configuration process 700, which may be employed with the automatic mode of operation. The process begins with a call initiation at step S700. This initiation may be done by either party, and does not require that both users be wireless mobile stations on the same network. For instance, one of the users may have a mobile station registered on a first network, while the other user may have a mobile station registered on a second network. In an alternative, the second user may have a wired or wireless voice over IP ("VOIP") device, which may be communicating through an Internet server.

At steps S702 and S704, determinations are made about the calling party and called party tiers of quality/security services. This may be done in accordance with any of the embodiments set forth herein. At step S706 a determination is made as to whether the tiers of service quality/security of both parties match. If there is a match, then as shown in step S708 the call may commence without service level changes by a network device (e.g., a base station). After the call, the process may terminate at step S710.

It should be noted that in the case of devices operating on different networks and/or offerings by different providers, there may not be an exact conformity between tiers of service. In accordance with an aspect of the invention, even if there is not an exact match of tiers, if the quality of service between the users' tiers correlates in accordance with a predetermined threshold, then a match may be declared and the process would proceed at step S708. For instance, assume a first user has a first tier of service quality/security corresponding to use of a first vocoder. The other user may operate on a different network with a second tier of service corresponding to use of a second vocoder. If the two vocoders provide voice quality levels commensurate with one another, e.g., a 10.0 kbps CELP codec for the first vocoder and a 9.5 kbps EVRC codec for the second vocoder, then a predetermined threshold may be satisfied and the call may commence. Correlation in accordance with such a threshold may be determined in accordance with equivalent voice quality levels as set forth above.

If the tiers of service do not match, then as shown at step S712 a network element (e.g., a base station) may select an appropriate level of service for the device (e.g., mobile station) having the lower tier of service. For instance, as shown at step S714, a vocoder of the lower tier device may be selected to match the higher tier of the other user's device. Alternatively or additionally, additional bandwidth may be selected to match that of the higher tier device. As shown at step S716, the vocoder or bandwidth may be set to a predetermined bit rate or quality level commensurate with the higher tier device. One of both of the caller/callee parties may be billed in accordance with the upgrade, as shown by step S718. After the call, the process may end at step S710.

Another mode of operation may exist where, once a call is initiated, the tier of operation of the calling/called party is identified. This may be done, by way of example, with a network device such as a serving base station querying a customer record database. Alternatively, the calling/called party's device may identify its level of quality/security service as set forth above, such as via an identifier that is part of a transmitted data packet. In either case, the premium tier mobile station may be notified about the difference in service levels. At this point, the premium tier mobile station user may elect to upgrade the other party's quality/security levels for the call. For instance, the premium tier party may choose to pay to upgrade the other party's plan/tier for the current call.

Alternatively, the lower tier party may be notified that the other party operates or is capable of operating at the premium tier. Here, the lower tier party may be offered the opportunity to upgrade his/her tier for the duration of the call. In yet another alternative, the lower tier party may initially be offered the upgrade option first and if he/she declines, then the premium tier party may be offered the option to upgrade the other party. Or in a further alternative, the premium tier party may initially be offered the upgrade option first and if he/she declines, then the lower tier party may be offered the option to upgrade the other party. In still another alternative, at the time of subscribing to a wireless service, a party choosing a tier less than the highest tier may be offered as part of the plan an option for an automatic upgrade to a higher tier whenever this party receives a phone call from a second party having a higher tier of serves to match the second party's tier, on a pay-per-call basis or for a fixed monthly surcharge.

Figure 17:
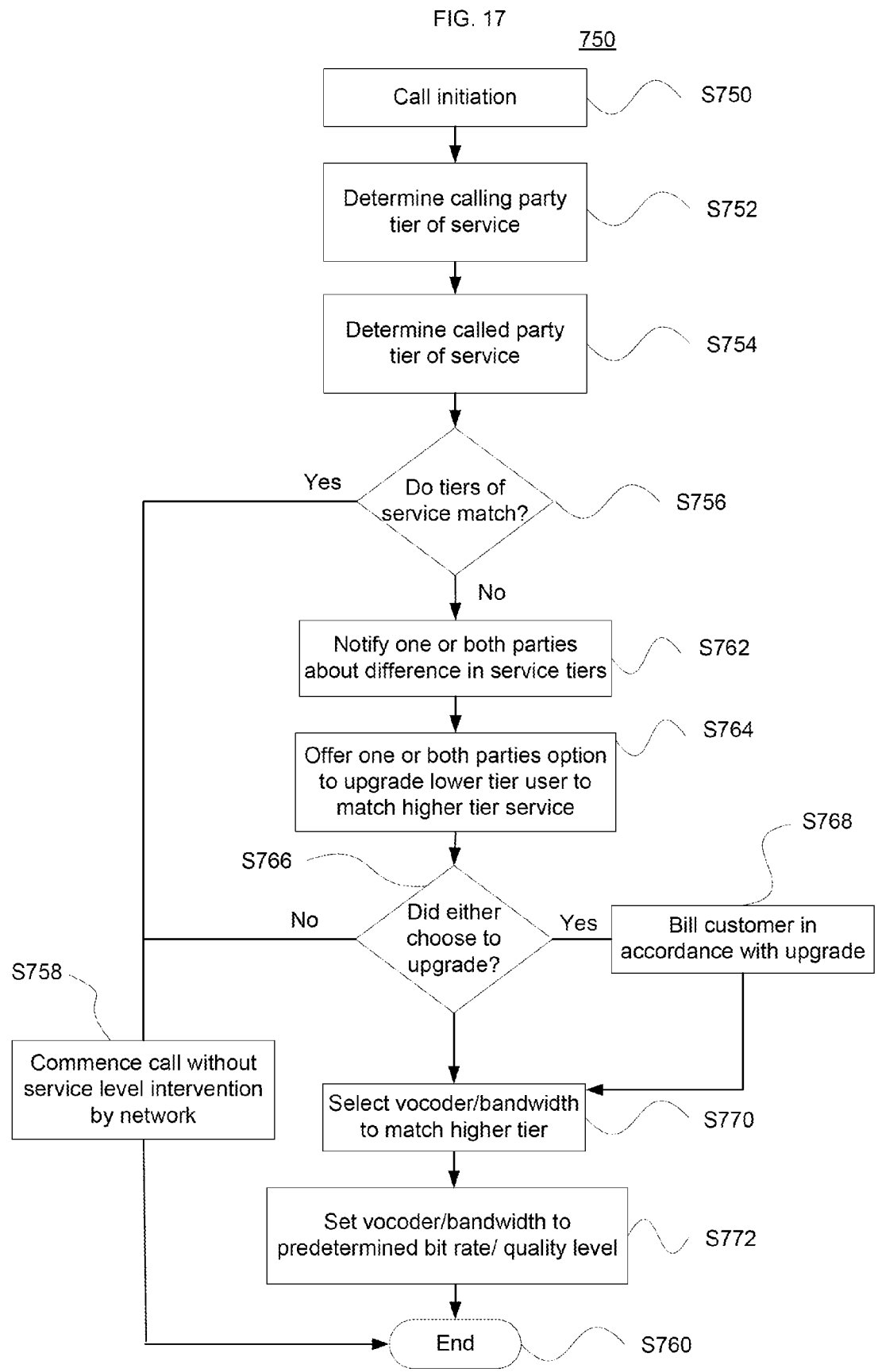
FIG. 17 is a flow diagram illustrating a second upgrade operation in accordance with aspects of the present invention.

FIG. 17 illustrates an exemplary call configuration process 750, which may be employed with yet another mode of operation. The process begins with a call initiation at step S750. As discussed above with regard to process 700 of FIG. 16, this initiation may be done by either party, and does not require that both users be wireless mobile stations on the same network. For instance, one of the users may have a mobile station registered on a first network, while the other user may have a mobile station registered on a second network. In an alternative, the second user may have a wired or VoIP device, which may be communicating through an Internet servers.

At steps S752 and S754, determinations are made about the calling party and called party tiers of services. This may be done in accordance with any of the embodiments set forth herein. At step S756, a determination is made as to whether the tiers of service of both parties match. If there is a match, then as shown in step S758 the call may then commence. After the call, the process may terminate at step S760.

If there is not a match, then one or both parties to the call may be notified about the difference in service tiers, as shown in step S762. Each notified party may be offered an option to upgrade the lower tier user to match the service level of the higher tier user, as shown in step S764, or this upgrade may take place automatically according to each user's service plan. This may be done by checking the user account record to see if the user has elected an option to upgrade his/her service on a call by call basis in the event of a call with another user with a higher tier of service. Or this may be done if the higher tier user's account record includes an indication that the user elects to upgrade the other party. In another example, an indicator or request may be sent to one or both users for display or other identification on the respective user device. Here, the respective user may or may not choose to upgrade the service.

A query may be made at step S766 to see if a user elected to upgrade the service level of the lower tier device. If no upgrade was chosen, then the process may continue at step S758. If an upgrade was chosen, then the user who elected the upgrade may be billed commensurately as shown in step S768.

As shown at step S770, a vocoder of the lower tier device may be selected to match the higher tier of the other user's device. This selection may be done by either user or by the network (e.g., serving base station). Alternatively or additionally, additional bandwidth may be selected to match that of the higher tier device. As shown at step S772, the vocoder or bandwidth may be set to a predetermined bit rate or quality level commensurate with the higher tier device. After the call, the process may end at step S760.

Figure 18:
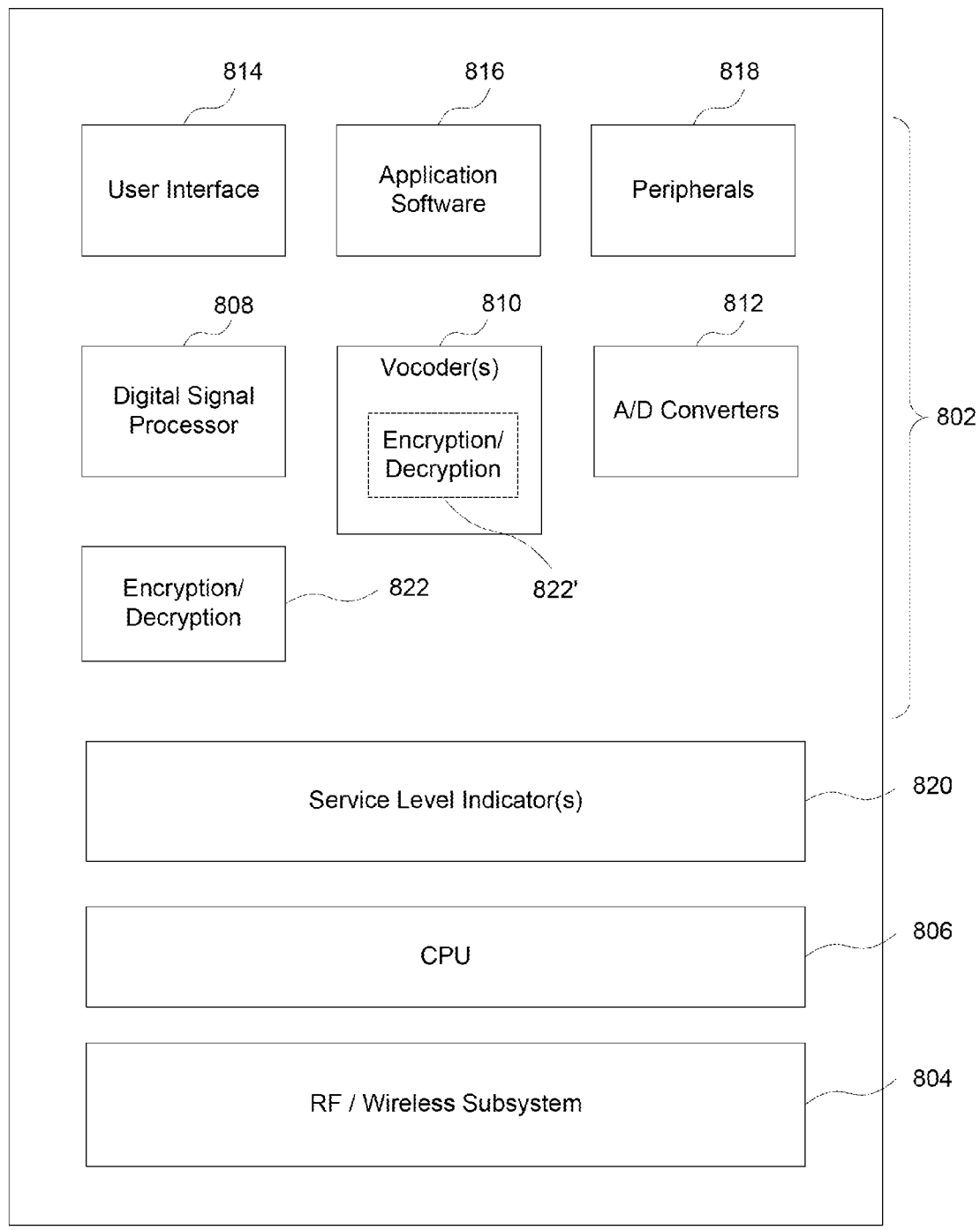
FIG. 18 illustrates a station architecture in accordance with aspects of the present invention.

FIG. 18 illustrates an alternative mobile station or base station 800 for use in accordance with aspects of the present invention. The overall configuration is similar to the architectures in FIGS. and 10. As shown in FIG. 18, the station 800 may include a baseband subsystem 802 and an RF or wireless subsystem 804. Both the baseband and RF subsystems may be controlled by a processor such as CPU 806. The RF subsystem 804 preferably includes transceiver coupled to an antenna (not shown). By way of example only, the baseband subsystem may include DSP 808, one or more vocoders 810, A/D converters 812, a user interface 814, application software 816, peripherals 818 and one or more quality/security service levels indicators 820, which may be hard programmed into the station 800. In one example, this may be done by programming the quality/security service levels indicators 820 into firmware of the baseband subsystem 802. In another example, the programming may be accomplished by recording the quality/security service levels indicators 820 in a nonvolatile memory such as a ROM during manufacture of the station 800. In a further example, the quality/security service levels indicator(s) are hard programmed onto a subscriber identity module ("SIM") card, which can be received through one of the peripherals 818.

The DSP 808 may perform various signal processing tasks, and the vocoder(s) 810 may be separate from or part of the DSP 808. In one example, the DSP is part of the processor 806 and/or may perform operations of the processor 806. Multiple vocoders may be desirable, especially in the situation where the mobile station is configured to operate on different carriers' networks such as a WCDMA network and a GSM network. Each vocoder may support multiple bit rates. The user interface may include a text interface, a GUI, actuators such as switches, buttons and the like. The application software may be configured to run/control various programs on the mobile station, such as a calendar program, a contacts program, games, an Internet browser, etc. Different peripherals may also be employed, such as an external audio output, microphone input, a charging connector and connectors for other electronic devices, such as a USB connector.

As shown, the station 800 also includes an encryption/decryption device 822 therein. The encryption/decryption device 822 may be separate from the vocoder(s) 810 or may be integrated therein, such as shown by encryption/decryption device 822'. The device 822 or 822' may be controlled by the CPU 806 and/or the DSP 808 in view of one or more service level indicators 820. For instance, a particular level of encryption may be applied to information transmitted from the station 800. This particular level of encryption may be set based upon a security service level indicator stored in the station 800. As discussed herein, a user may select a security level as part of a contract with a service provider. In addition, security levels may be negotiated and/or adjusted when communicating among mobile stations that may initially be set to different security levels.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Furthermore, while particular processes are shown in a specific order in the appended drawings, such processes are not limited to any particular order unless such order is expressly set forth herein.

In accordance with an aspect of the invention, the security levels are determined per a service contract. Due to the sensitivity of security implementation, it is desirable to separate transmission and security planes, and concentrate security operation in hands of the service provider. While this is desirable, such an implementation does not preclude other alternatives.

INDUSTRIAL APPLICABILITY

The present invention enjoys wide industrial applicability including, but not limited to, communicating among user devices in wireless communication networks. The present invention allows devices to effectively utilize a communications channel and supports high quality and security of transmission, which will benefit service providers and subscribers alike.

The invention claimed is:

1. A method of setting a security level in a cellular communication network comprising a plurality of base stations, a plurality of mobile stations and a network server, the network server having a customer record database associated therewith, the method comprising:
   receiving an incoming call indication by a first one of the plurality of mobile stations, the first mobile station being registered with the cellular communication network;
   determining a security level associated with the first mobile station; and
   selecting a security protocol for use by the first mobile station, the selection being determined by the first mobile station's security level;
   wherein:
      the plurality of mobile stations further includes a second mobile station;
      determining further comprises determining a security level of the second mobile station; and
      selecting further comprises:
         identifying a higher tier security service level from among the first and second mobile station security levels; and
         selecting a security protocol for use by the first and second mobile stations, the selection being determined by the higher tier security service level.

2. A method of setting a security level in a cellular communication network comprising a plurality of base stations, a plurality of mobile stations and a network server, the network server having a customer record database associated therewith, the method comprising:
   receiving an incoming call indication by a first one of the plurality of mobile stations, the first mobile station being registered with the cellular communication network;
   determining a security level associated with the first mobile station; and
   selecting a security protocol for use by the first mobile station, the selection being determined by the first mobile station's security level;
   wherein:
      the plurality of mobile stations further includes a second mobile station;
      determining further comprises determining a security level of the second mobile station; and
      selecting further comprises:
         identifying a lower tier service level from among the first and second mobile station security levels; and
         selecting a security protocol for use by the first and second mobile stations, the selection being determined by the lower tier security service level.

3. A method of setting a security level in a cellular communication network comprising a plurality of base stations, a plurality of mobile stations and a network server, the network server having a customer record database associated therewith, the method comprising:
   receiving an incoming call indication by a first one of the plurality of mobile stations, the first mobile station being registered with the cellular communication network;
   determining a security level associated with the first mobile station; and
   selecting a security protocol for use by the first mobile station, the selection being determined by the first mobile station's security level;
   wherein the plurality of mobile stations further includes a second mobile station, the determining includes determining a service level of the second mobile station and the selecting further comprises:
      identifying a higher tier service level from among the first and second mobile station service levels;
      selecting at least one of a vocoder and a vocoder bit rate for use by the first and second mobile stations based upon the higher tier service level;
      adaptively adjusting a given service level for a higher tier subscriber device among the first and second mobile stations so that the higher tier subscriber device is configured communicate at a lowest tier service level;
      adaptively measuring a quality of transmission between the first and second mobile stations;
      adaptively adjusting a quality of signal level to a next higher signal level if a transcoder reports signal degradation; and
      repeating the identifying, selecting, adaptively adjusting the given service level, adaptively measuring and adaptively adjusting the quality of signal level operations until a higher service level of a subscriber's mobile station is satisfied or no further adjustment of the service level of the subscriber's mobile station is possible.

* * * * *